United States Patent [19]

Pagallo et al.

[11] Patent Number: 5,592,566
[45] Date of Patent: Jan. 7, 1997

[54] METHOD AND APPARATUS FOR COMPUTERIZED RECOGNITION

[75] Inventors: Giulia Pagallo, Cupertino; Ernest H. Beernink, San Carlos; Michael C. Tchao, Palo Alto; Stephen P. Capps, San Carlos, all of Calif.

[73] Assignee: Apple Computer, Incorporated, Cupertino, Calif.

[21] Appl. No.: 456,554

[22] Filed: Jun. 1, 1995

Related U.S. Application Data

[63] Continuation of Ser. No. 1,123, Jan. 5, 1993, which is a continuation-in-part of Ser. No. 889,216, May 27, 1992, abandoned.

[51] Int. Cl.⁶ ............................................. G06K 9/00
[52] U.S. Cl. .................................... 382/187; 382/190
[58] Field of Search ............................. 382/100, 209, 382/218, 229, 187, 282, 309, 317, 119, 135, 137, 138, 176, 177, 178, 179, 185, 186, 188, 189, 190, 192, 193, 194, 197, 198, 199, 200, 201, 202, 203, 204, 205, 217, 224, 227, 228, 312, 313, 314, 321; 358/505, 530, 540, 400, 401, 403, 424, 453, 462, 470

[56] References Cited

U.S. PATENT DOCUMENTS

| | | | |
|---|---|---|---|
| 4,365,235 | 12/1982 | Greanias et al. | 340/146 |
| 4,561,105 | 12/1985 | Crane et al. | 382/13 |
| 4,641,354 | 2/1987 | Fukunaga et al. | 382/13 |
| 4,680,804 | 7/1987 | Kuzunuki et al. | 382/13 |
| 4,972,496 | 11/1990 | Sklarew | 382/13 |
| 5,010,579 | 4/1991 | Yoshida et al. | 382/13 |
| 5,058,182 | 10/1991 | Kuan et al. | 382/25 |

Primary Examiner—Leo Boudreau
Assistant Examiner—Bijan Tadayon
Attorney, Agent, or Firm—Hickman Beyer & Weaver

[57] ABSTRACT

A recognition system for a pen-based computer system characterized by: a tablet for inputting strokes from a stylus; a low-level recognizer responsive to the strokes and operative to perform low-level recognition on the strokes; a high-level recognizer responsive to at least some of the strokes and operative to perform high-level recognition on those strokes; and a recognition interface permitting communication between the recognizers and an application program. The high-level recognizer includes a controller capable of receiving units to be recognized; a number of recognition domains coupled to the controller, where each of the recognition domains can receive one or more units from the controller and is capable of providing an interpretation of the meaning of the one or more units to the controller; and an arbiter coupled to the controller which is capable of resolving conflicts between multiple interpretations developed by the recognition domains. A method implemented by the high-level recognition system includes the steps of creating a stroke object from a stroke generated by the stylus on the tablet; grouping the stroke object with at least one other stroke object, if possible; classifying the stroke object by passing the stroke object to a number of recognition domains; and arbitrating between conflicting classifications generated by the recognition domains. This permits unstructured, free-form inputs to a pen-based computer system to be recognized and acted upon by the system.

24 Claims, 33 Drawing Sheets

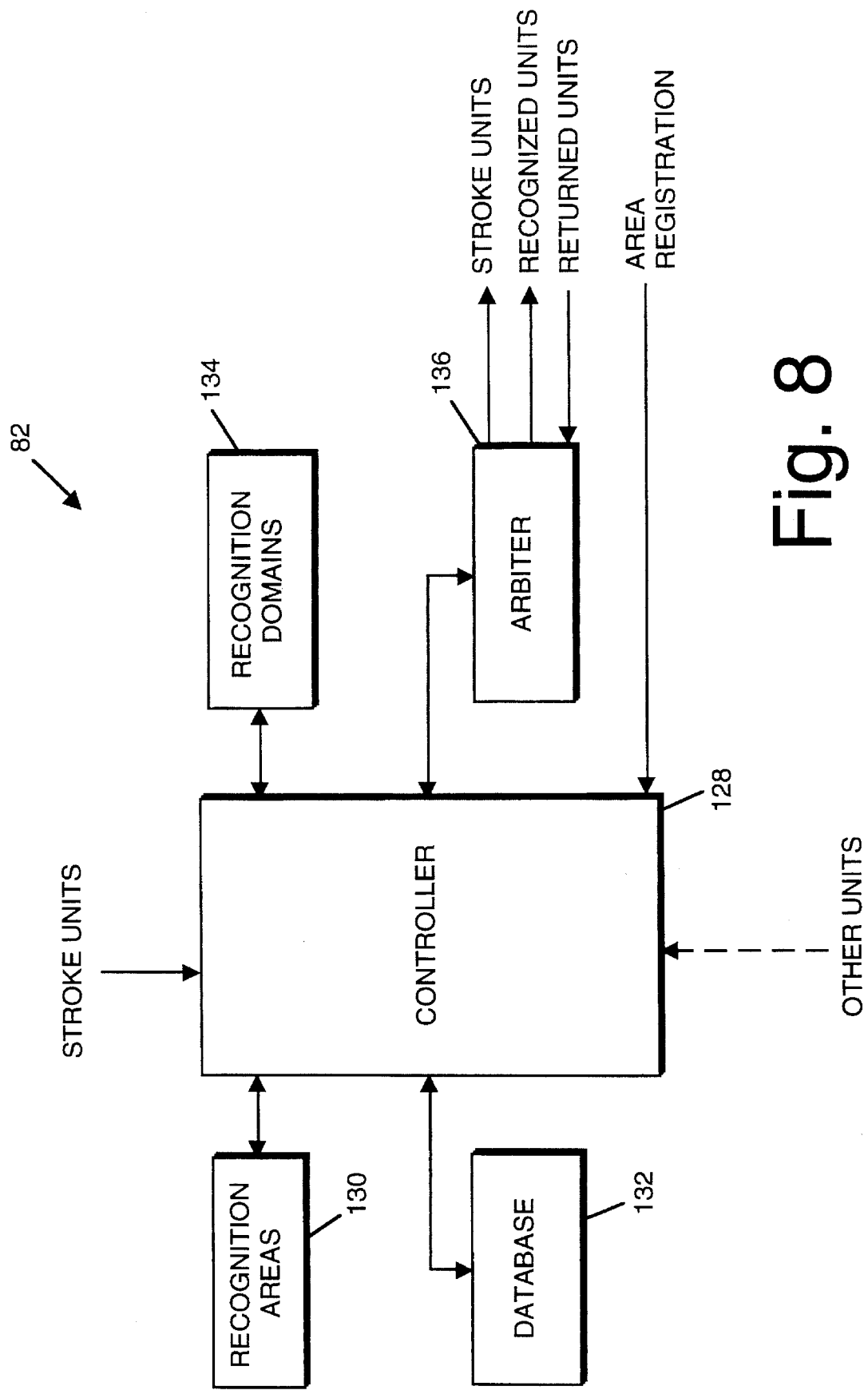

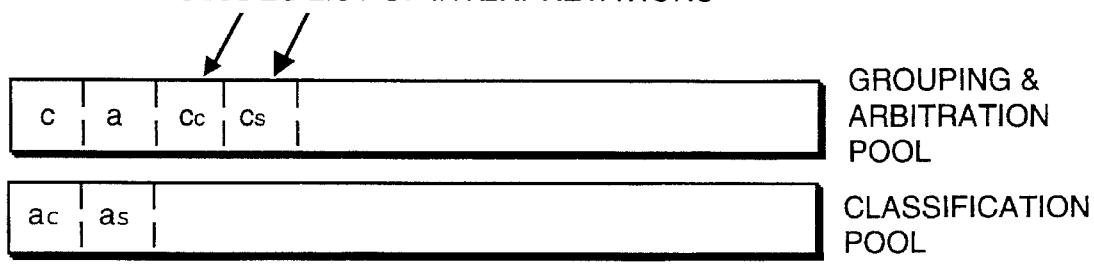
Fig. 33b
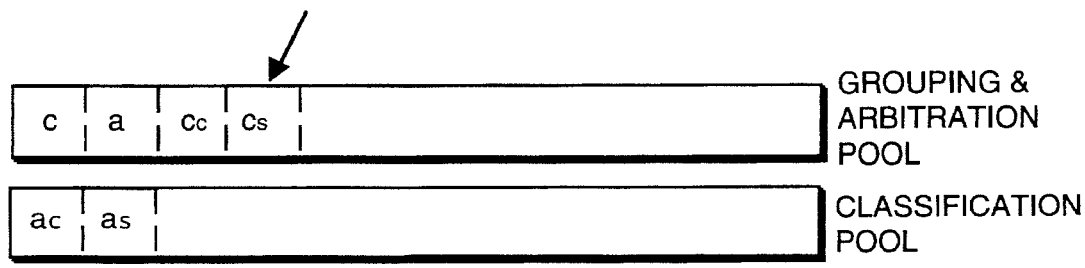
Fig. 33c
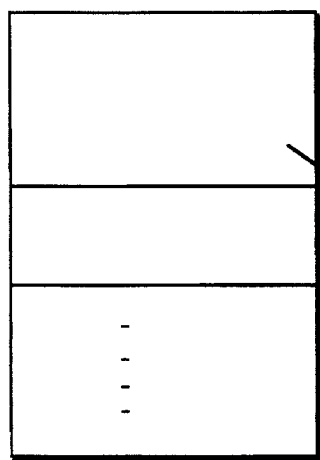 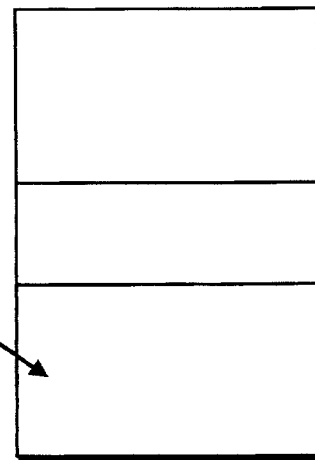
Fig. 34

WORD UNIT car_w

TYPE : WORD
LEVEL = 3
MIN STROKE ID = 1
MAX STROKE ID = 4

SUBUNITS
c_c
a_c
r_c

INTERPRETATIONS
"car"  RANK 110
"ear"  RANK 420
"can"  RANK 800

Fig. 37

METHOD AND APPARATUS FOR COMPUTERIZED RECOGNITION

REFERENCE TO RELATED APPLICATIONS

This application is a continuation of a co-pending application Ser. No. 08/001,123, filed Jan. 5, 1993 which in turn is a continuation-in-part of application Ser. No. 07/889,216, filed May 27, 1992, now abandoned, and both of which are assigned to the assignee of the present application, and both of which are hereby incorporated by reference in their entirety.

BACKGROUND OF THE INVENTION

This invention relates generally to handwriting recognition, and more particularly to handwriting recognition in a pen-based computer system.

A pen-based computer system typically comprises a small, hand-held computer where the primary method for inputting data includes a "pen" or stylus which "writes" upon the screen of the computer system. The screen is a dual-function display assembly which serves as both an input device and an output device. When operating as an input device, the display assembly senses the position of the tip of a stylus on the viewing screen and provides this positional information to the computer's central processing unit (CPU). Some display assemblies can also sense the pressure of the stylus on the screen to provide further information to the CPU. When operating as an output device, the display assembly presents computer-generated images on the screen.

The dual-function display assemblies of pen-based computer systems permit users to operate the computer as a computerized notepad. For example, graphical images can be input into the pen-based computer by merely moving the stylus on the surface of the screen. As the CPU senses the position and movement of the stylus, it generates a corresponding image on the screen to create the illusion that the stylus is drawing the image directly upon the screen, i.e. that the stylus is "inking" an image on the screen. Besides serving as a notepad, pen-based computers can provide a number of useful functions, such as serving as an address book, an appointment calendar, a to-do list, etc.

Ink on the screen of a pen-based computer system is typically stored as a simple bit-map. Essentially, the only knowledge that the computer system has of the inked image is that certain pixels of the display are to be activated to create the inked image. Therefore a note, such as "Meet Bob Tuesday" has no meaning to the system other than certain pixels of the screen are to be turned on or off to create the inked image of the words.

It is often desirable to perform some level of recognition on the inked objects formed on the computer screen. In this way, additional meaning can be attached to the inked objects allowing the computer to manipulate the objects in a more intelligent fashion. For example, a common recognition for pen-based computer systems is handwriting recognition. In this way, the inked object "Meet Bob Tuesday" can be "recognized" as comprising three words separated by spaces where each word comprises a number of letters. The recognized words and letters can be convened into an appealing font, and can be used and manipulated as words and letters rather than as bits in a bit-map.

There are a great many methods for recognizing handwriting known in the prior art. However, these recognition methods tend to be narrowly focused on a particular type of recognition task. For example, there are prior art recognizers for recognizing alphanumeric inputs, for recognizing graphical inputs, etc. If a recognizer of the prior art does not recognize a particular type of object that object is typically treated as ink.

This form of limited recognition imposes certain restraints on a pen-based computer system. For example, some prior art pen-based computer systems require that alphanumeric data be written in specific, defined locations or "fields" on the screen. Alphanumeric information not written in those fields may not be recognized, and non-alphanumeric information written within the fields will not be recognized. This limits the pen-based computer system to essentially serving as a computerized entry form rather than a free-form notepad.

SUMMARY OF THE INVENTION

The present invention performs a recognition task on strokes that are entered into a pen-based computer system in an unstructured or flee-form fashion. The system uses a number of recognition domains, each of which is designed to recognize a certain type of object and to provide an interpretation of that object's meaning. In the event that them are multiple interpretations for a particular inked object or stroke, the system will perform an arbitration function to determine a "best guess."

A recognition system for a pen-based computer system in accordance with the present invention includes a tablet for inputting strokes made by a stylus; a low-level recognizer responsive to the strokes and operative to perform low-level recognition on the strokes; a high-level recognizer responsive to at least some of the strokes and operative to perform high-level recognition on at least some of the strokes; and a recognition interface permitting communication between the recognizers and an application program. The low-level recognizer can, for example, recognize strokes having special meanings known as "gestures." For example, a special gesture can be provided to select certain portions of the computer screen, or to provide a "breaker bar" between adjacent notes. The high-level recognizer, on the other hand, recognizes higher level meanings from strokes, such as characters and words in English and other languages, simple geometric shapes such as triangles and squares, etc. The interface can pass recognized objects to the application program, and can receive back objects that have been rejected by the application program.

A high-level recognition system in accordance with the present invention includes a controller capable of receiving units to be recognized; a number of recognition domains coupled to the controller where each of the recognition domains can receive one or more units from the controller and is capable of providing an interpretation of the one or more received units to the controller; and an arbiter coupled to the controller which is capable of resolving conflicts between multiple interpretations developed by the recognition domains. The controller is preferably responsive to stroke units generated by a stylus on the screen of a pen-based computer system, but may also be responsive to units provided by other types of input devices (e.g., voice recognition units). The controller is also preferably coupled to a number of recognition areas and to a recognition database. The recognition domains are each designed to recognize a particular type of object, e.g., there can be a recognition domain to recognize letters, words, kanji characters, numbers, formulas, simple geometric shapes, etc. If the recognition domains develop multiple interpretations of an object, the arbiter attempts to determine the "best" interpretation of the object.

A method for recognizing strokes in accordance with the present invention includes creating a stroke object from a stroke generated by a stylus on a tablet; grouping the stroke object with at least one Other stroke object, if possible; classifying the stroke object by passing the stroke object to a plurality of recognition domains; and arbitrating between conflicting classifications generated by the recognition domains. Preferably, the step of grouping the stroke object is also performed within the recognition domains.

An advantage of this invention is that inked objects on the screen of a pen-based computer system can be recognized and manipulated by the computer system. There are few constraints imposed upon a user of the computer system to enter data in particular fields of areas, and multiple interpretations of strokes made by the user are possible. Conflicting interpretations can be resolved by arbitration performed by the system.

These and other advantages of the present invention will become apparent upon a reading of the following detailed description and a study of the drawings.

BRIEF DESCRIPTION OF THE DRAWINGS

FIG. 8 is a block diagram illustrating the high-level recognizer of FIG. 3;

FIGS. 33a–33c illustrate the grouping & arbitration pool and the classification pool at this point in the process;

FIG. 34 illustrates the pointing of Stroke 3 to the internal list of the merged area;

FIG. 37 illustrates a word unit generated by the process;

DETAILED DESCRIPTION OF THE PREFERRED EMBODIMENTS

The present invention is well suited for pointer based computer systems such as the pen-based, stylus-based and mouse driven systems that are currently popular. For the purposes of illustration, the invention will be described in connection with a pen-based system.

Figure 1:
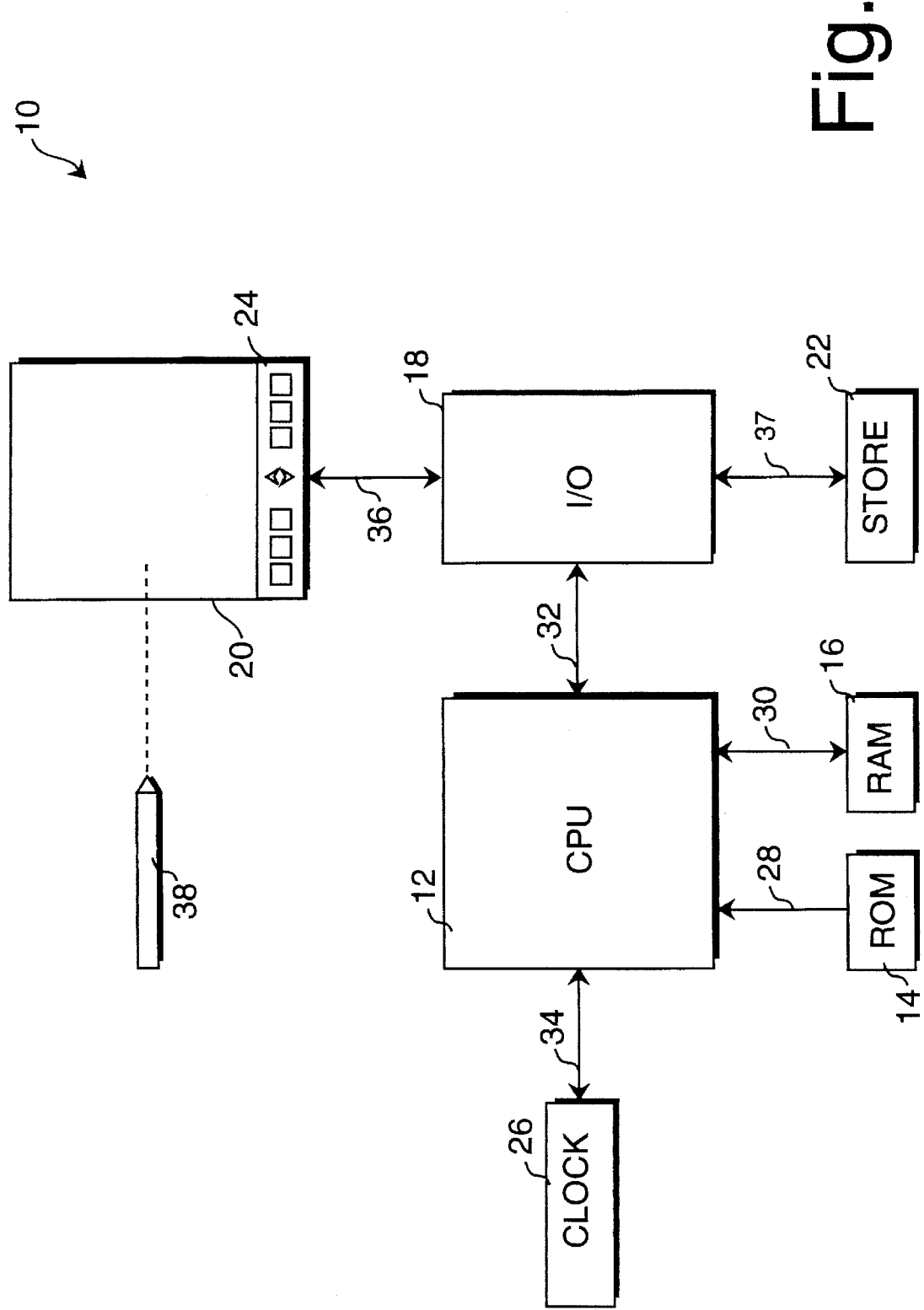
FIG. 1 is a block diagram of a computer system in accordance with the present invention.

As shown in FIG. 1, a pen-based computer system 10 in accordance with the present invention includes a central processing unit (CPU) 12, read only memory (ROM) 14, random access memory (RAM) 16, input/output (I/O) circuitry 18, and a display assembly 20. The pen-based computer system 10 may also optionally include a mass storage unit 22 such as a disk drive unit or nonvolatile memory such as flash memory, a keypad 24, and a clock 26.

The CPU 12 is preferably a commercially available, single chip microprocessor. While CPU 12 can be a complex instruction set computer (CISC) chip, it is preferable that CPU 12 be one of the commercially available, reduced instruction set computer (RISC) chips which are known to be of generally higher performance than CISC chips. CPU 12 is coupled to ROM 14 by a unidirectional data bus 28.

ROM 14 contains the basic operating system for the pen-based computer system 10. CPU 12 is connected to RAM 16 by a bi-directional data bus 30 to permit the use of RAM 16 as scratch pad memory. ROM 14 and RAM 16 are also coupled to CPU 12 by appropriate control and address busses, as is well known to those skilled in the art. CPU 12 is also coupled to the I/O circuitry 18 by bi-directional data bus 32 to permit data transfers with peripheral devices.

I/O circuitry 18 typically includes a number of latches, registers and direct memory access (DMA) controllers. The purpose of I/O circuitry 18 is to provide an interface between CPU 12 and such peripheral devices as display assembly 20, mass storage 22, and the keypad 24.

Clock 26 provides a series of clock pulses and is typically coupled to an interrupt port of CPU 12 by a data line 34. The clock pulses are used to time various functions and events relating to the computer system 10. The clock 26 can be eliminated and the clock function replace by a software clock running on CPU 12, but this tends to be a wasteful use of CPU processing power. In the present invention, clock 26 provides clock pulses at 60 hertz (Hz).

Display assembly 20 of pen-based computer system 10 is both an input and an output device. Accordingly, it is coupled to I/O circuitry 18 by a bi-directional data bus 36. When operating as an output device, the display assembly 20 receives data from I/O circuitry 18 via bus 36 and displays that data on a suitable screen. The screen for display assembly 20 is preferably a liquid crystal display (LCD) of the type commercially available from a variety of manufacturers. The input device of display assembly 20 is preferably a thin, clear membrane which covers the LCD display and which is sensitive to the position of a stylus 38 on its surface. These position sensitive membranes are also readily available on the commercial market. Combination display assemblies such as display assembly 20 which include both the LCD and the input membrane are commercially available from such vendors as Scriptel Corporation of Columbus, Ohio.

The keypad 24 can comprise an array of switches. In the present embodiment, the keypad 24 comprises mechanical buttons which overlie the bottom edge of the membrane which covers the LCD display. When the buttons are depressed, the membrane senses the pressure and communicates that fact to the CPU 12 via I/O 18.

Other types of pointing devices can also be used in conjunction with the present invention. While the method of the present invention is described in the context of a pen-based system, other pointing devices such as a computer mouse, a track ball, or a tablet can be used to manipulate a pointer on a screen of a general purpose computer. Therefore, as used herein, the terms "pointer", "pointing device", "pointing means", and the like will refer to any mechanism or device for pointing to a particular location on a screen of a computer display.

Some type of mass storage 22 is generally considered desirable. Mass storage 22 can be coupled to I/O circuitry 18 by a bi-directional data bus 37. However, the mass storage 22 can be eliminated by providing a sufficient amount of RAM 16 to store user application programs and data. In that case, the RAM 16 could be provided with a backup battery to prevent the loss of data even when the pen-based computer system 10 is turned off. However, it is generally desirable to have some type of long term storage 22 such as a commercially available miniature hard disk drive, non-volatile memory such as flash memory, battery backed RAM, PC-data cards, or the like.

In operation, information is input into the pen-based computer system 10 by "writing" on the screen of display assembly 20 with a stylus 38. Information concerning the location of the stylus 38 on the screen of the display assembly 20 is input into the CPU 12 via I/O circuitry 18. Typically, this information comprises the Cartesian (i.e. x & y) coordinates of a pixel of the screen of display assembly 20 over which the tip of the stylus is positioned. Commercially available combination display assemblies such as the aforementioned assemblies available from Scriptel Corporation include appropriate circuitry to provide the stylus location information as digitally encoded data to the I/O circuitry of the present invention. The CPU 12 then processes the data under control of an operating system and possibly an application program stored in ROM 14 and/or RAM 16. The CPU 12 next produces data which is output to the display assembly 20 to produce appropriate images on its screen.

Figure 2:
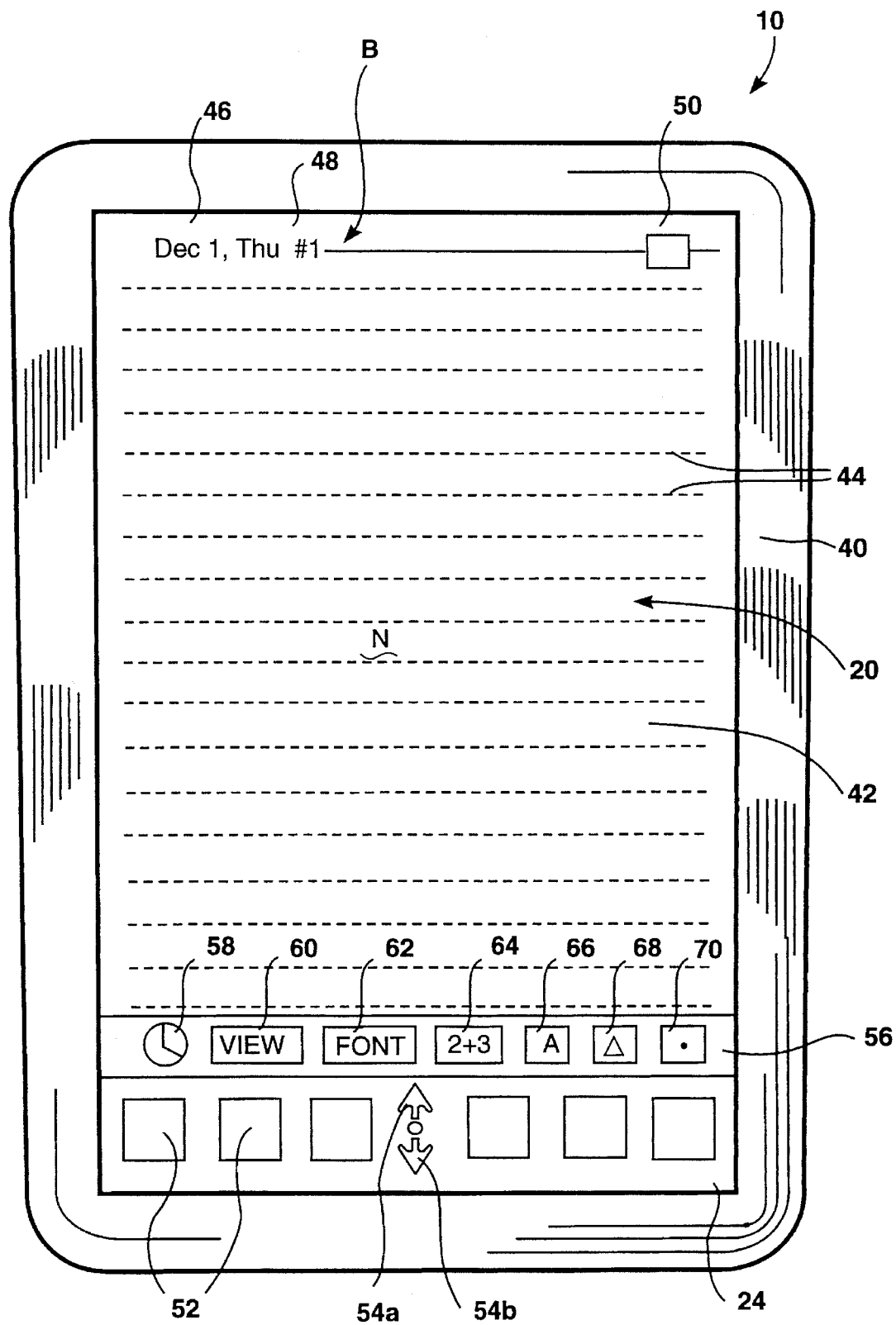
FIG. 2 is a top plan view of the screen, case, and keypad of the computer system of FIG. 1.

In FIG. 2, the pen-based computer system 10 is shown housed within a generally rectangular enclosure 40. The CPU 12, ROM 14, RAM 16, I/O circuitry 18, mass storage 22, and clock 26 are preferably fully enclosed within the enclosure 40. The display assembly 20 is mostly enclosed within the enclosure 40, but a viewing screen 42 of the display assembly is exposed to the user. As used herein, the term "screen" will refer to the portion of the display assembly 20 which can display an image that can be viewed by a user. Also accessible to the user is the keypad 24.

Upon power-up, pen based computer system 10 displays on screen 42 an initial note area N including a header bar B and a number of guidelines 44. The header bar B preferably includes the date of creation 46 of the note N, a note number 48, and a "toolbox" button 50. The optional guidelines 44 aid a user in entering text, graphics, and data into the pen-based computer system 10.

In this preferred embodiment, the keypad 24 is not a part of the viewing screen 42 but rather, is a permanent array of input buttons coupled to the CPU 12 by I/O circuitry 18. Alternatively, the keypad 24 could comprise "soft buttons" i.e. images generated at convenient locations on the screen 42, in which case a "button" would be activated by touching the stylus to the screen over the image of the button. The keypad 24 preferably includes a number of dedicated function buttons 52 and a pair of scroll buttons 54A and 54B. The operation of the scroll buttons 54A and 54B, and other aspects of computer system 10 are discussed in greater detail in co-pending U.S. patent application Ser. No. 07/868,013, filed Apr. 13, 1992 on behalf of Tchao et al., entitled "Method for Manipulating Notes on a Computer Display", and assigned to the same assignee as the present application, the disclosure of which is hereby incorporated herein in its entirety. In this embodiment, the toolbox button 50 is represented as a "soft button" in the header bar B. However, in alternative embodiments, a physical keypad button could be used in its place.

The screen illustrated in FIG. 2 is referred to as the "notepad", and is an application program running under the operating system of the pen based computer system 10. In this preferred embodiment, the notepad is a special or "base" application which is always available beneath higher level applications. The notepad application, like other applications, run within a window, which in this instance comprises the entire viewing screen 42. Therefore, as used herein, a "window" is the entire screen or any portion of an entire screen which is dedicated to a particular application program.

A status bar 56 is provided at the bottom of the notepad application. The status bar 56 is provided with a number of active areas including a real time clock 58, a view button 60, a font button 62, a formulas button 64, a text button 66, a graphics button 68, and a nib button 70. U.S. patent application Ser. No. 07/976,970 filed Nov. 16, 1992 on behalf of Foster et. al, entitled "Status Bar for Application Windows" and assigned to the assignee of the present invention describes how to make and use the status bar, and is incorporated herein by reference in its entirety.

Figure 3:
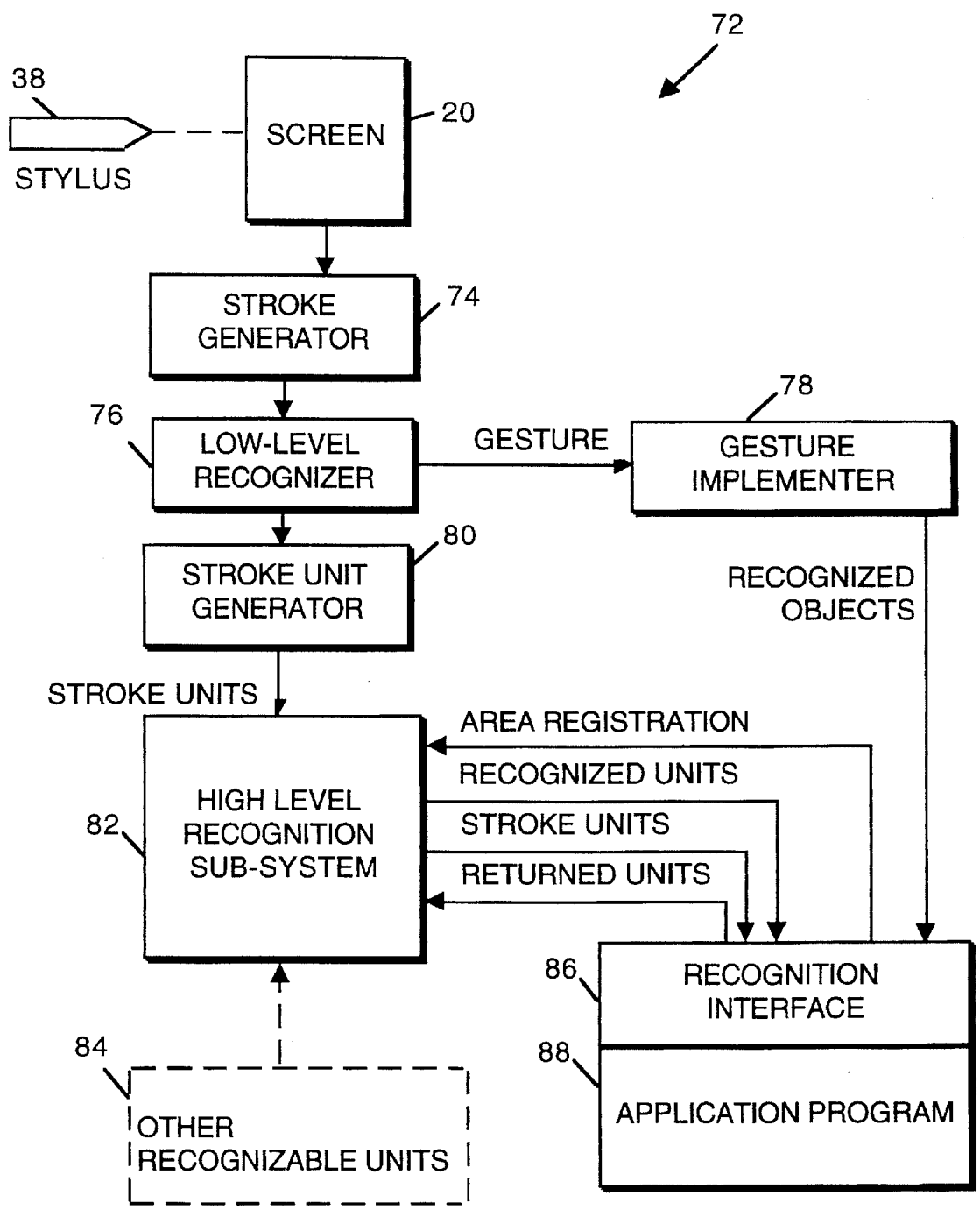
FIG. 3 is a block diagram of a recognition system for the pen-based computer system illustrated in FIGS. 1 and 2.

FIG. 3 is a block diagram of a recognition system 72 in accordance with the present invention forming a part of the pen-based computer system illustrated in FIGS. 1 and 2. One of the preferred modes of data entry into the computer system 10 is the formation of strokes on the screen 20 with stylus 38. The strokes can be entered on all of the active areas of the screen, including on the header bar B, on the note area N, on the status bar 56, etc. As used herein, the term "stroke" will refer to a series of data points developed by the screen 20 generated during the period of time when the stylus 38 first contacts the screen 20 and when it is subsequently removed from the screen 20. A stroke can therefore comprise a string of cartesian (x-y) coordinates taken at discrete intervals of time between "pen-down" and "pen-up" of stylus 38. Of course, data compression techniques are preferably used to minimize the storage requirements for characterizing a stroke.

The data points comprising the stroke are entered into a stroke generator 72 which converts the data points into a stroke recognizable by the recognition system 72. Preferably, the data points are placed in a circular queue, possibly with some compression, e.g. when the stylus is not moving on the screen 42. The stroke generator passes the stroke to a low-level recognizer 76 which passes recognized gestures to a gesture implementor 78. Low-level recognizer 76 and gesture implementors 78 are described in co-pending U.S. patent application Ser. No. 07/888,741, filed May. 26, 1992 on behalf of S. Capps, entitled "Method for Selecting Objects on a Computer Display", and assigned to the assignee of the present invention, the disclosure of which is incorporated herein by reference in its entirety.

Strokes which are not recognized by low-level recognizer 76 are formed into stroke units by a stroke unit generator 80. These stroke units are passed onto a high-level recognition subsystem 82 which performs high-level recognition tasks. The high-level recognizer 82 can also receive other recognizable units 84 from such sources as digitized audio inputs, serial I/O ports, keyboards, etc. The high-level recognition subsystem 82 communicates with a recognition interface 86 associated with an application program 88. As explained previously, the application program can comprise such applications as the notepad, a calendar, a to-do list, etc. The application program 88 can also include higher level application programs such as word processors, spread sheets, relational database managers, etc.

The recognition interface 86 can receive recognized objects from the gesture implemented 78 and can also receive recognized units and stroke units from the high-level recognition subsystem 82. The recognition interface can send area registration information to the high-level recognizer, and can also return units to the high-level recognizer that the application program chooses not to accept.

Figure 4:
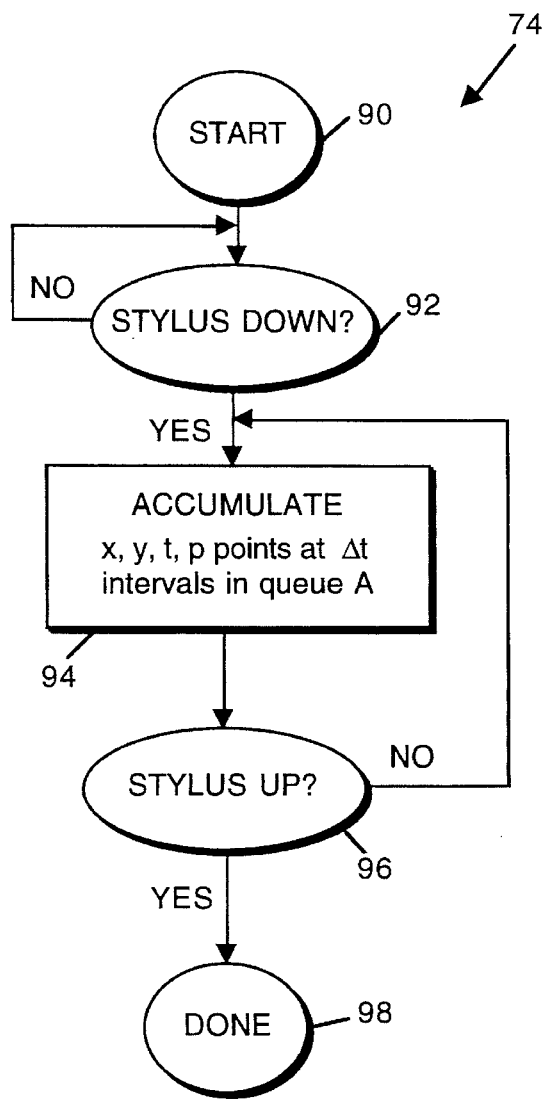
FIG. 4 is a flow diagram illustrating the operation of the stroke generator of FIG. 3.

FIG. 4 is a flow diagram illustrating the operation of the stroke generator 74 of FIG. 3. The process starts at a step 90, and determines in a step 92 whether the stylus is down, i.e., whether the stylus has been placed in contact with the screen of a computer system. If not, the process goes into a wait state. If the stylus has been placed down, x, y, t, and p points are accumulated at time intervals Δt in an queue A. The points (x,y) are the Cartesian coordinates of the stylus at a time t, and p is the pressure of the stylus at time t. Next, in a step 96, it is determined whether the stylus has been lifted from the screen. If not, x, y, t, and p data is continually collected. If the stylus has been lifted from the screen as determined by step 96, a stroke has been completed as indicated at 98.

Figure 5:
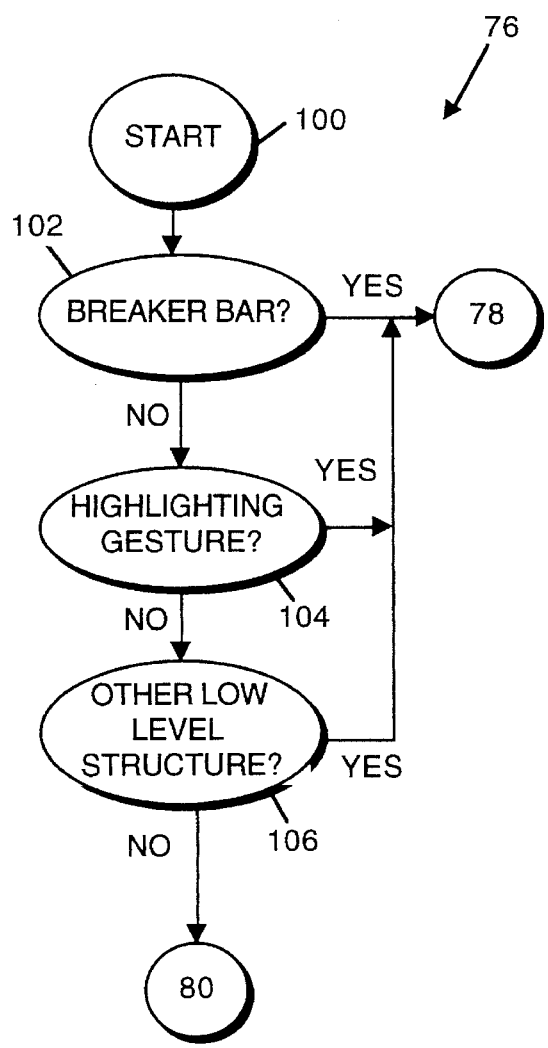
FIG. 5 is a flow diagram illustrating the operation of the low-level recognizer of FIG. 3.

FIG. 5 is a flow diagram illustrating the low level recognizer 76 of FIG. 3. The process begins at 100, and a step 102 determines whether a breaker bar gesture has been made. A method for low level detection of breaker bars is disclosed in co-pending U.S. patent application Ser. No. 07/868,013 of Tchao et al. cited previously. If a breaker bar gesture has been detected, process control is transferred to the gesture implementor 78. Again, methods for handling the breaker bar gesture are described in the Tchao et al. patent application.

If a breaker bar has not been detected, a step 104 determines whether a highlighting gesture has been detected. A method for recognizing highlighting gestures is disclosed in the aforementioned co-pending U.S. patent application Ser. No. 07/888,741 which was incorporated herein by reference. If a highlighting gesture is detected, process control is again turned over to the gesture implementor 78. If neither a breaker bar nor a highlighting gesture is detected, other low level structures can be detected in a similar fashion in a step 106. If the low level structure of gesture is detected, process control is returned to the gesture implementor 78, and if not, process control is returned to the stroke unit generator 80.

The stroke unit generator 80 of FIG. 3 takes the raw data developed by the stroke generator 74 and converts it into an object or unit which can be handled more conveniently by the system 10.

The term "object" has been used extensively in the preceding discussions. As is well known to software developers, an "object" is a logical software unit comprising data and processes which give it capabilities and attributes. For example, an object can be queried as to its type and can return such data as the number of words that it contains. Objects can contain other objects of the same or of a different type. Objects can also be used to project images on a screen according to their object type. There are many well know texts which describe object oriented programming. See, for example, *Object Oriented Programming for the Macintosh*, by Kurt J. Schmucher, Hayden Book Company, 1986.

Figure 6:
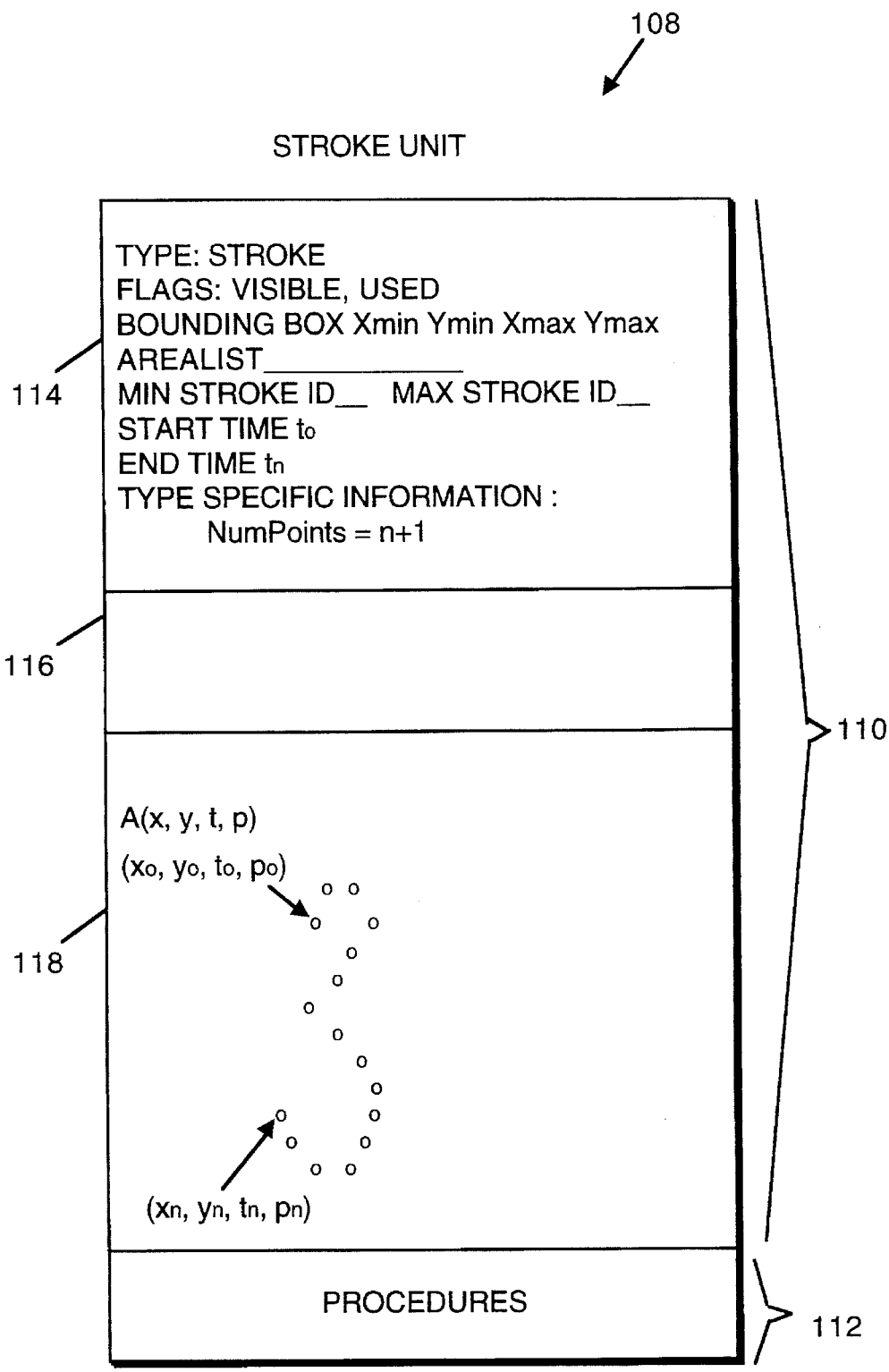
FIG. 6 is an illustration of a stroke unit being input into the high-level recognizer of FIG. 3.

Since the definition of "object" has been somewhat loosely used in the industry, we will refer to a stroke object herein as a "stroke unit." A stroke unit developed by the stroke unit generator 80 of FIG. 3 is shown in FIG. 6. Like all computerized objects, a stroke unit 108 includes a data portion 110 and a procedures portion 112. The data portion 110 is broken into three sections, namely, generic data 114, subunit data 116, and interpretation data 118. The generic data section includes a variety of information such as the type of unit (which in this case is a stroke unit) certain flags (such as Visible and Used), the bounding box for the stroke as defined by $x_{min}$, $y_{min}$, $x_{max}$, $y_{max}$, the AREALIST, the minimum stroke identification of the unit (minSTROKEID) the maximum stroke identification of the unit (maxSTROKEID), and various type specific information such as the number of points in the stroke. There will be more said about the generic data fields subsequently. The subunit data field 116 includes information concerning any subunits of the stroke unit 108. The interpretation data 118 includes the array of data points A (x, y, t, p) which is graphically illustrated in FIG. 6. Of course, in the computer system 10, these data points are stored as an array or queue of binary numbers. Preferably, a queue A extends from the first data point ($x_0$, $y_0$, $t_0$, $P_0$) to the n+1 data point, ($x_n$, $y_n$, $t_n$, $P_n$). The procedures portion 112 of the stroke unit provides the necessary methods and processes for the stroke unit 108 to operate as an autonomous object, as is well known to those skilled and the art.

Figure 7:
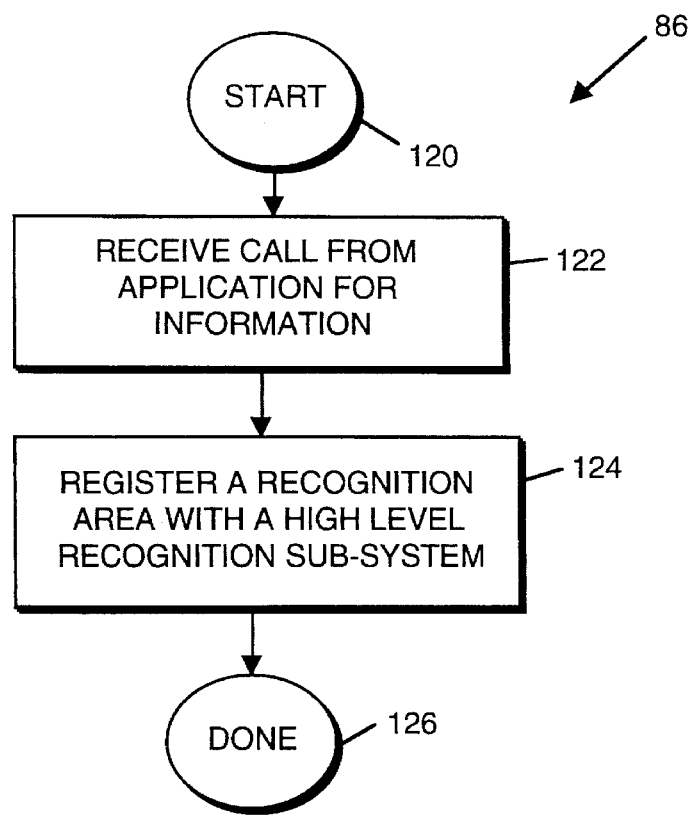
FIG. 7 is a flow diagram illustrating part of the functionality of the recognition interface of FIG. 3.

FIG. 7 illustrates a portion of the functionality of the recognition interface 86 of FIG. 3. The process starts at 120, and receives a call from the application program 88 for information in a step 122. The recognition interface 86 registers a recognition area with the high level recognizer in a step 124 and completes the process as indicated in 126.

In FIG. 8, the structure of the high level recognition subsystem 82 of the present invention is illustrated. The high level recognition subsystem 82 includes a controller 128, recognition areas 130, a database 132, recognition domains 134, and an arbiter 136. The controller 128 has, a, inputs, stroke units, other types of units (optional), and area registration information. The arbiter 136 has an input for returned units from an application program, and has outputs for stroke units and recognized units.

Figure 9:
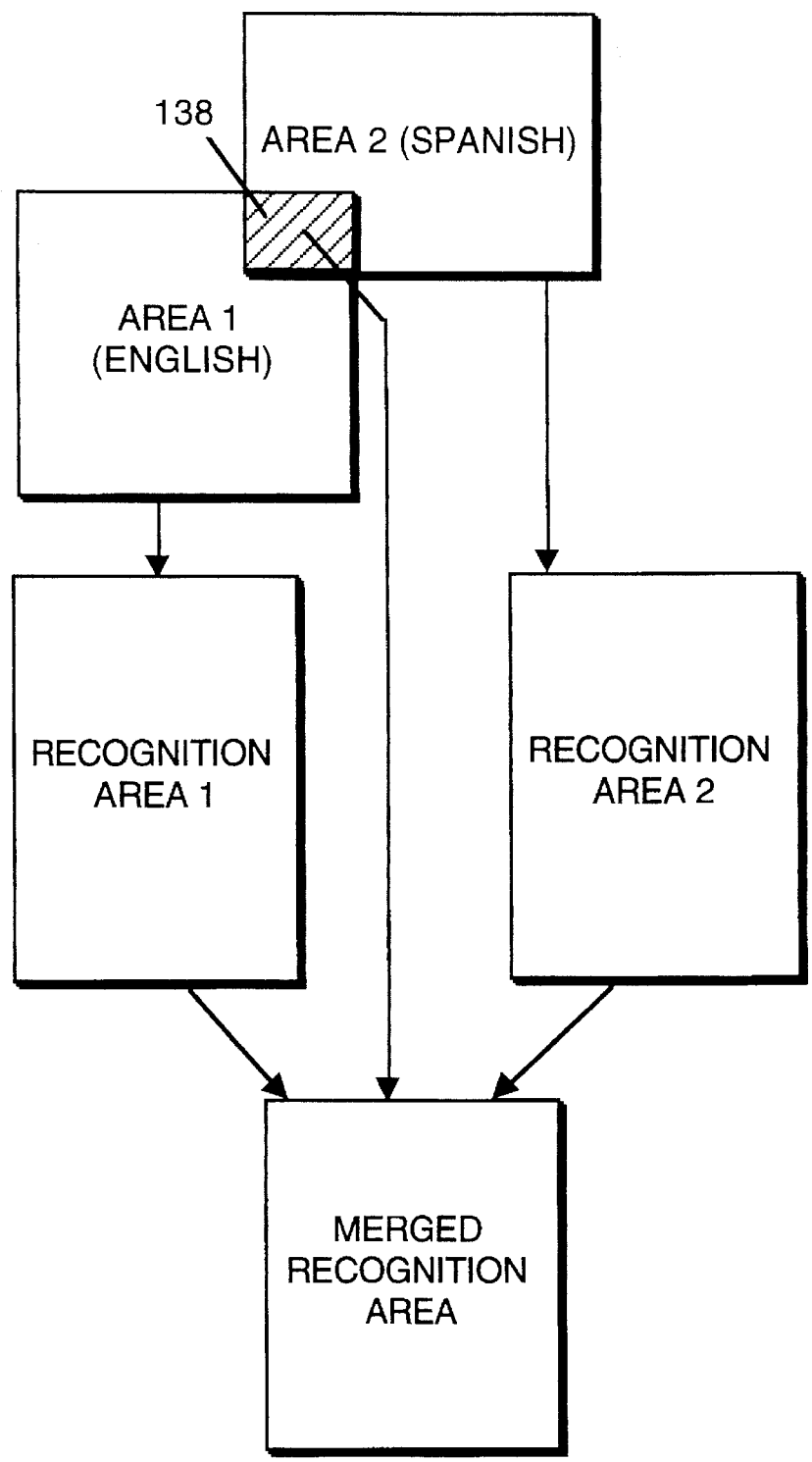
FIG. 9 is a block diagram illustrating the recognition areas of FIG. 8.

The concept of the recognition areas 130 of FIG. 8 is illustrated in FIG. 9. A recognition area is a physical area on the screen 42 of computer 10 where recognition is to be performed. For the purpose of example, assume there is an Area 1 on the computer screen 42 where information in English is to be entered. Also assume, for the purpose of this example, that there is an Area 2 on the screen 42 of computer 10 where Spanish is to be recognized. Further assume that Area 1 and Area 2 overlap on the screen 42 such that there is an overlap area 138 where both English and Spanish can be recognized. Area 1 will be assigned a recognition area 1 as part of the recognition areas 130 and Area 2 will be assigned recognition area 2 as part of the recognition areas 130. Since Area 1 and Area 2 overlap, a merged recognition area can be formed which is also part of the recognition areas 130. Of course, there can be a "merged" area formed from multiple areas that occupy the same physical space on the screen, i.e. areas having the same bounding boxes. In this case, the merged area is simply an area on the screen where information of many types can be recognized. The recognition areas and the merged recognition areas will be discussed in greater detail subsequently.

Figure 10:
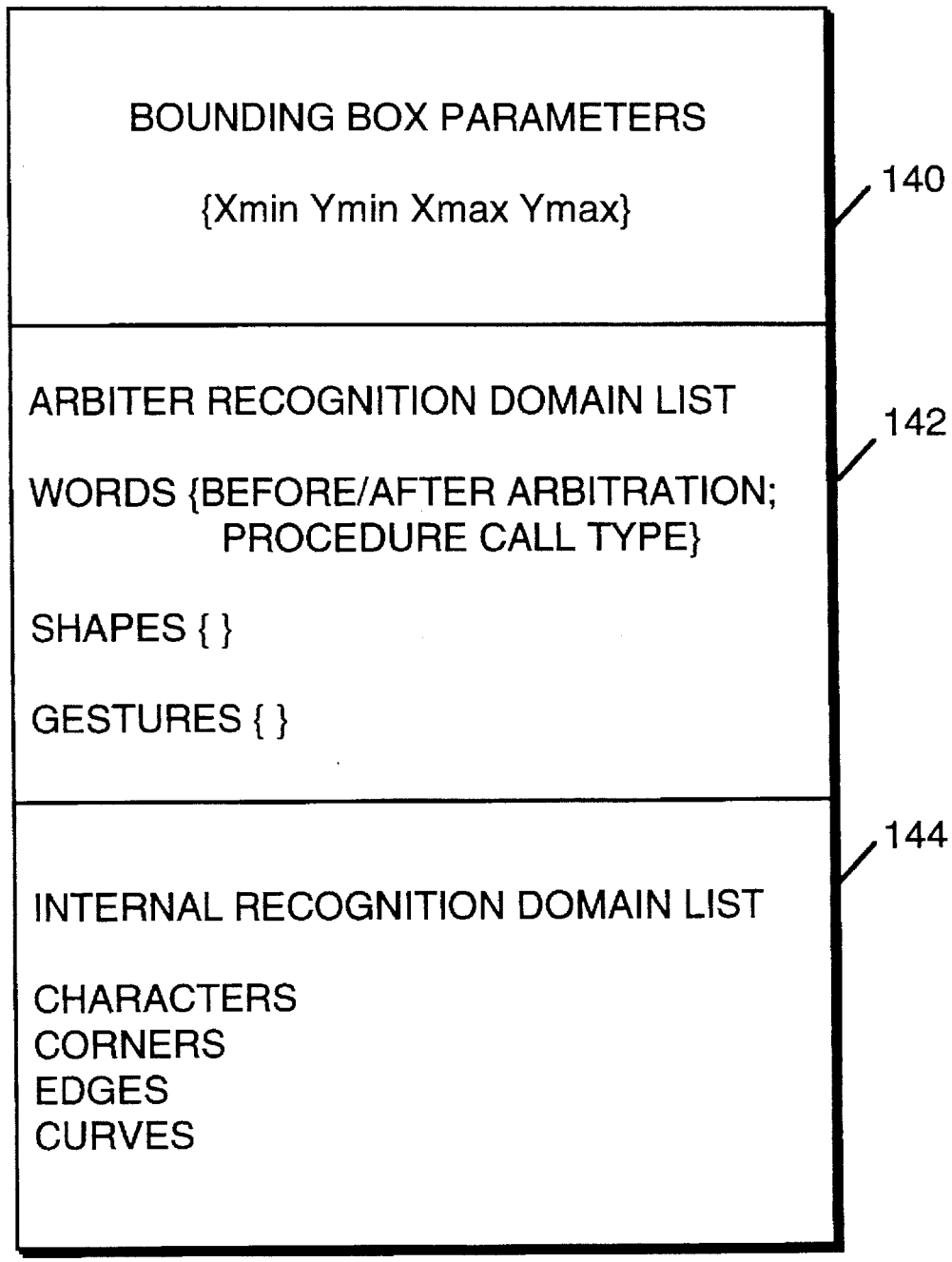
FIG. 10 further illustrates the recognition area of FIG. 8.

FIG. 10 illustrates, in greater detail, the recognition Area 1 of FIG. 9. The recognition area illustrated in FIG. 10 is an object including both data and procedures. However, only the data portion of the object representing the recognition area is shown in FIG. 10. The data area of the recognition area 1 has three sections 140, 142 and 144. Section 140 includes the bounding box parameters of area 1 of FIG. 9, i.e., $x_{min}$, $y_{min}$, $x_{max}$, and $y_{max}$. Section 142 includes the arbiter recognition domain list including words, shapes, and gestures. The parameters for each of the members of the recognition domain list are included within brackets. For example, the parameters for words are before/after arbitration flag and procedure name. Section 144 includes an internal recognition domain list including characters; corners, edges, and curves. An example will be provided later demonstrating the use of these parameters and lists.

Figure 11:
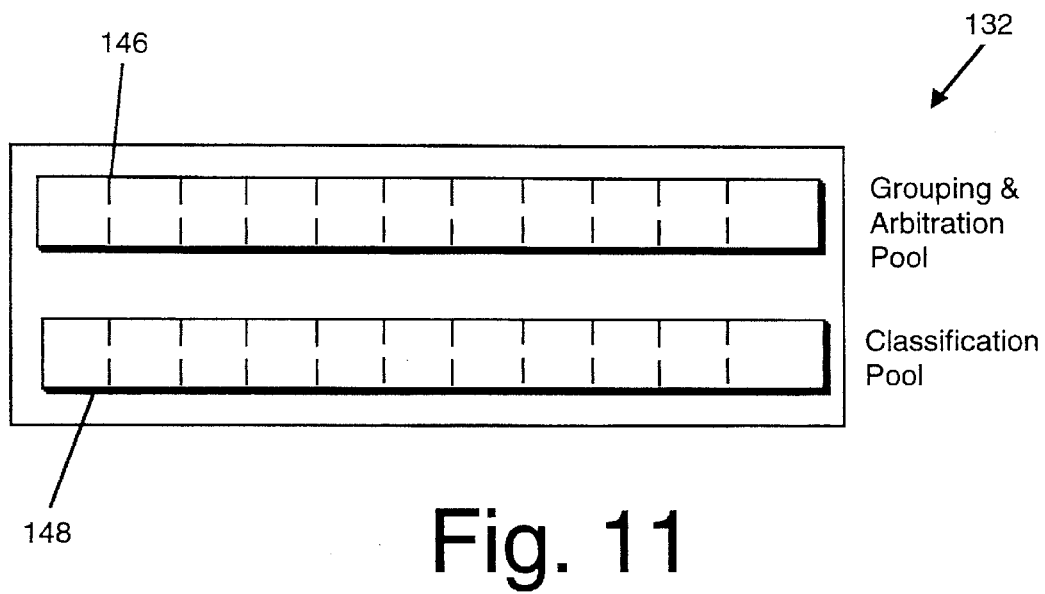
FIG. 11 is used to illustrate the database of FIG. 8.

FIG. 11 illustrates the database 132 of FIG. 8. The database 132 is conceptually broken down into a grouping and arbitration pool 146 and a classification pool 148. The use and operation of the grouping and arbitration pool 146 and the classification pool 148 will be discussed in greater detail subsequently.

Figure 12:
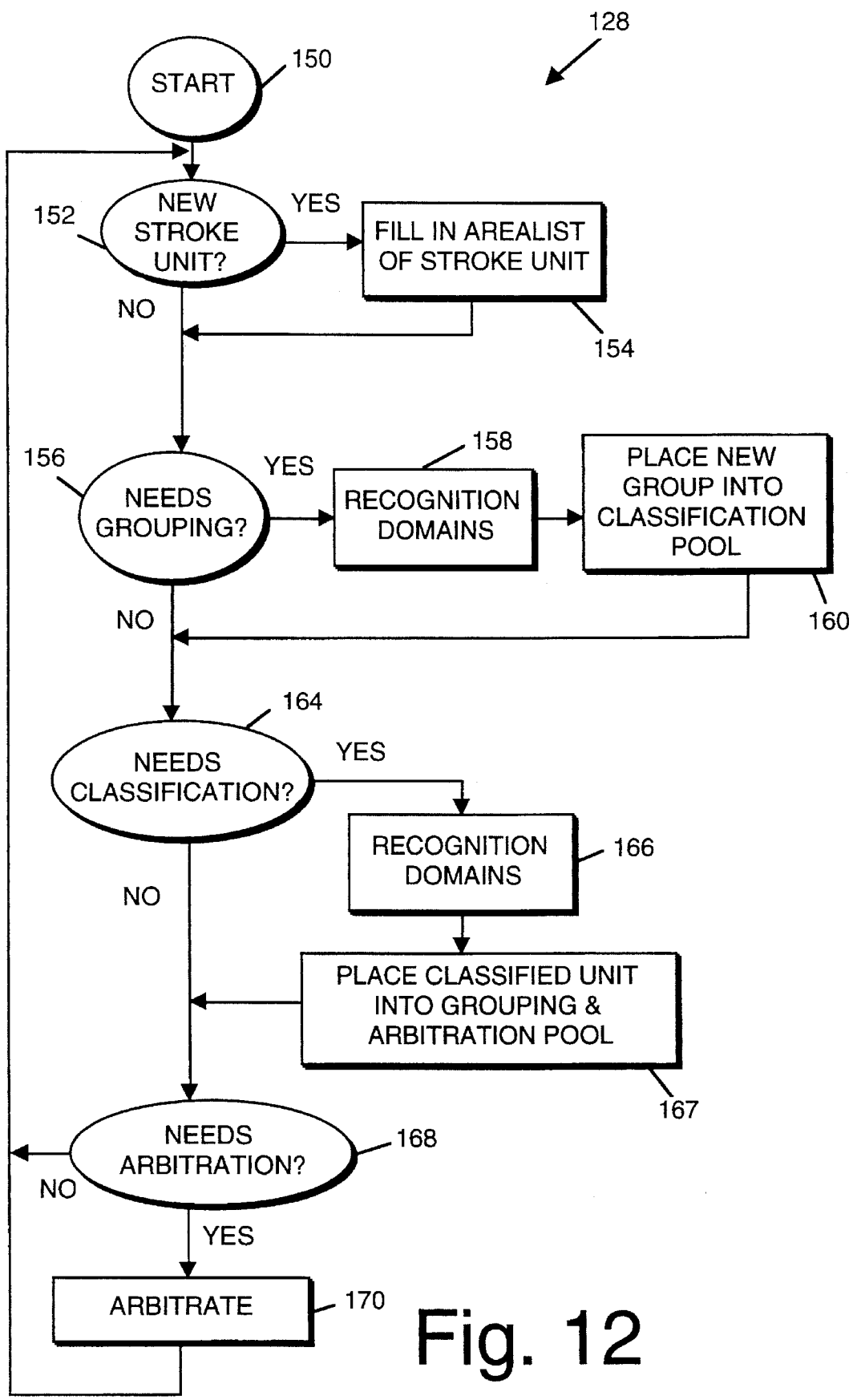
FIG. 12 is a flow diagram illustrating the process steps undertaken by the controller of FIG. 8.

FIG. 12 is a flow diagram illustrating the operation of the controller 128 of FIG. 8. The process begins at 150, and in a step 152 it is determined whether the unit comprises a new stroke. If it does, the AREALIST of the stroke unit is filled-in in a step 154. In a step 156, it is determined whether any unit needs grouping. If it does, each unit is passed to the recognition domains in a step 158, and each new group unit is moved into the classification pool 148 in a step 160.

In step 164, it is determined whether any unit needs classification. If it does, each unit is passed to the recognition domains in a step 166, and a step 167 places each classified unit into the grouping and arbitration pool. A step 168 determines whether arbitration is required, and if it is, each unit is arbitrated in a step 170. If no arbitration is needed, or after arbitration is completed, process control returns to step 152.

Figure 13:
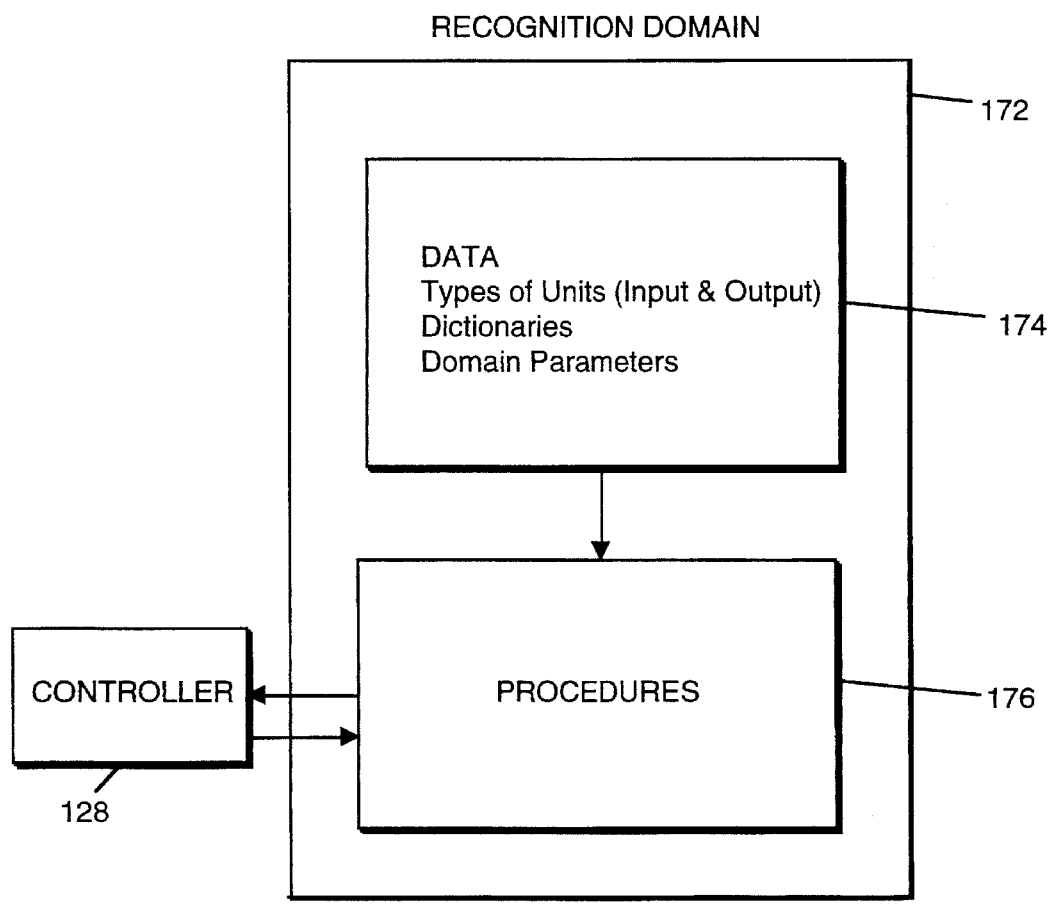
FIG. 13 illustrates a recognition domain of FIG. 8.

FIG. 13 illustrates a recognition domain 172 of the recognition domains 134 of FIG. 8. This recognition domain 172 is, itself, an object including a data portion 174 and a procedures portion 176. The procedures portion 176 communicates with the controller 128 in a dialogue-like fashion. The procedures portion 176 has access to the data portion 174, which includes such data as the type of units recognized by the recognition domain 150, dictionaries, and domain parameters. Each domain 172 has both grouping and classification capabilities.

Figure 14:
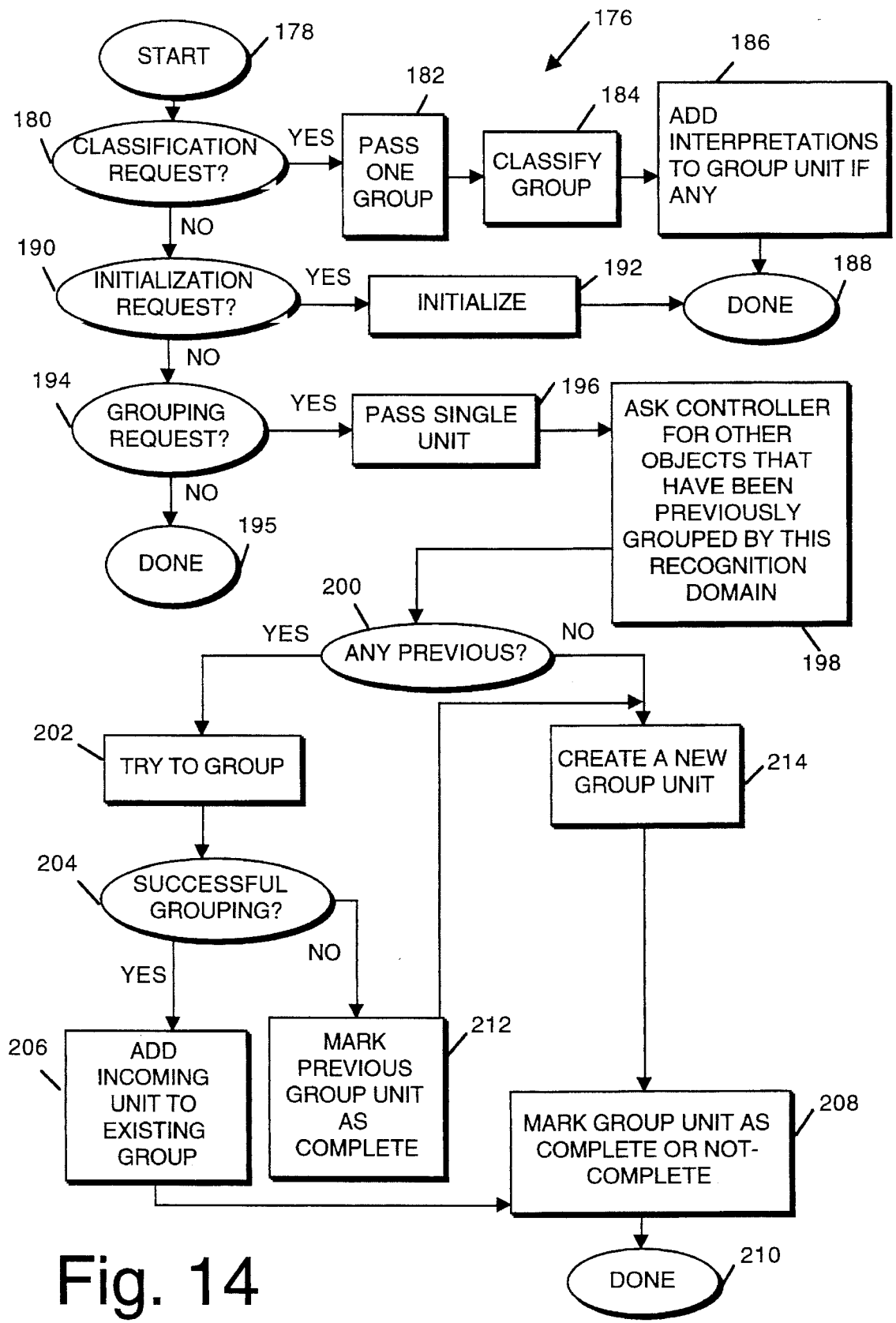
FIG. 14 illustrates the process steps taken by the procedures portion of the recognition domain of FIG. 13.

In FIG. 14, the steps of methods 176 of FIG. 13 are illustrated in greater detail. The process 176 starts at 178 and a decision step 180 determines whether there is a classification request. If there is, step 182 passes one group from the controller to the recognition domain, and this group is classified in a step 184. Step 186 adds the interpretation(s) to the group unit if there are any. The process is then complete as indicated at 188. If step 180 determines that there is not a classification request, a decision step 190 determines whether there is an initialization request. If there is, step 192 performs the initialization and the process is complete at 188. If there is no initialization request, step 194 determines whether there is a grouping request. If not, the process is completed as indicated at 195. If there is a grouping request, a single unit is passed in a step 196, and step 198 asks the controller for other objects that have been previously grouped by this recognition domain. Step 200 determines if there were any previously grouped objects, and if there were, step 202 attempts to group the objects. Decision step 204 determines whether the grouping was successful, and if it was the incoming group is added to the existing group in step 206 and the group unit is marked as complete or non-complete in a step 208. At this point, the process 176 is complete as indicated at 210. If step 204 determines that the grouping was not successful, a step 212 marks previous group units as complete and creates a new group unit in a step 214 with the incoming unit. The group unit is then marked as complete or non-complete in step 208 and the process is again completed at step 210. It should be noted that steps 180, 190, 194 are not necessarily completed in that order: these steps are preferably performed when the corresponding method is evoked.

Figure 15:
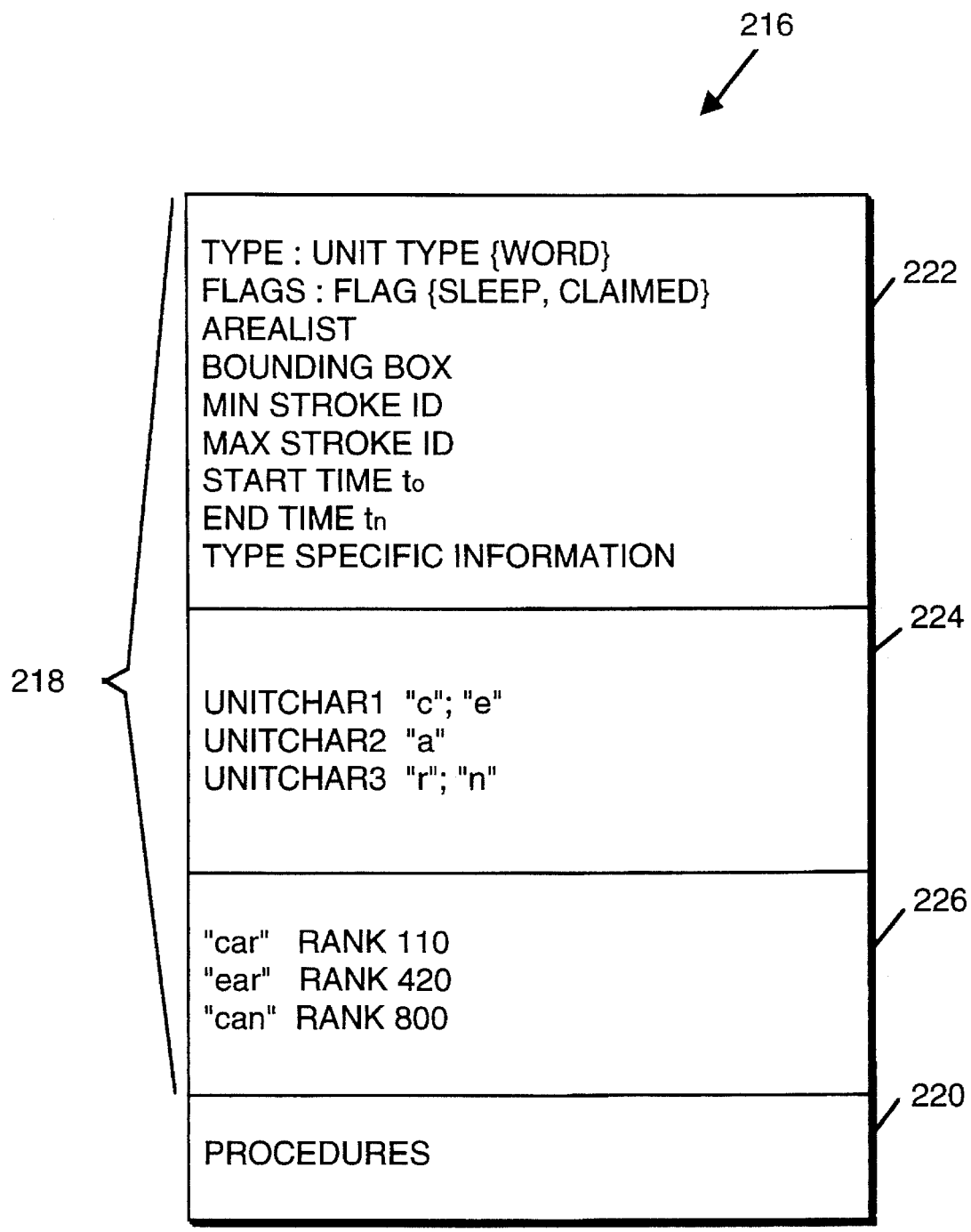
FIG. 15 illustrates a unit structure utilized by the present invention.

FIG. 15 is used to illustrate the structure of a unit in greater detail. A unit 216 includes a data portion 218 and a procedures portion 220. The data portion 218 includes a generic section 222, a subunit section 224, and an interpretation section 226. The generic section includes dam types which will be found in all unit structures. For example, the generic section will include the type (which in this case is unit), flags such as sleep and claimed, an AREALIST, a bounding box, minSTROKEID, maxSTROKEID, and type specific information. The subunit section 224 will contain subunits of the unit 216. For example, if the unit 216 is the word "car," it would likely have three subunits, unitchar1, unitchar2, and unitchar3. Unitchar1 would have its interpretations of the first letter of the word "car," unitchar2 would have its interpretations of the second letter, and unitchar3 would have its interpretations of the third letter. The interpretation data section 226 is a list of the interpretations for the unit 216 with their rankings. In this example, the word "car" has attained a rank 110, the word "ear" has attained a rank 420, and the word "can" has attained a rank of 800. The lower the rank number of the interpretation, the higher the level of confidence that the object has been recognized correctly. The procedures portion 220 include methods and processes which allow the unit to operate as an object.

Figure 16:
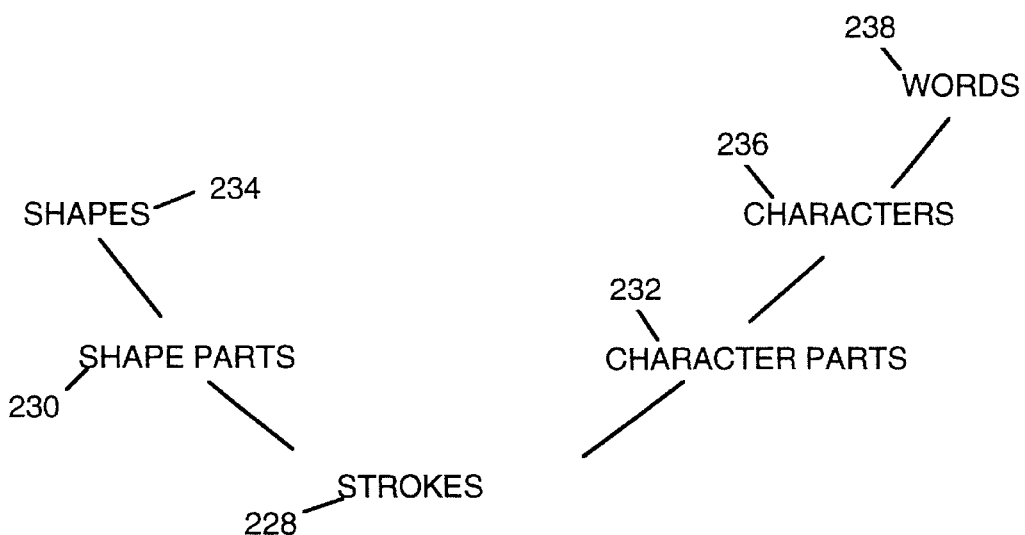
FIG. 16 illustrates a hierarchy of recognized units.

FIG. 16 illustrates a hierarchy of units used in a preferred embodiment of the present invention, as defined by the hierarchy of domains. At the lowest unit level there are strokes 228, and one level up there are shape parts 230 and character parts 232. One level up from shape parts 230 are shapes 234, and one level from character parts 232 are characters 236. A level up from characters 236 are words 238. Therefore, a word unit 238 would have character subunits, and a character unit 236 would have character part subunits, and character part units 232 would have stroke subunits 228. Stroke units have no sub-units in the present implementation. Similarly, a shapes unit 234 would have subunits of shape part units, and shape part units 230 would have subunits of stroke units. In another preferred embodiment of the present invention, word and shape units have only stroke units as their sub-units, i.e. the intermediate units may be omitted depending upon the implementation.

Figure 17:
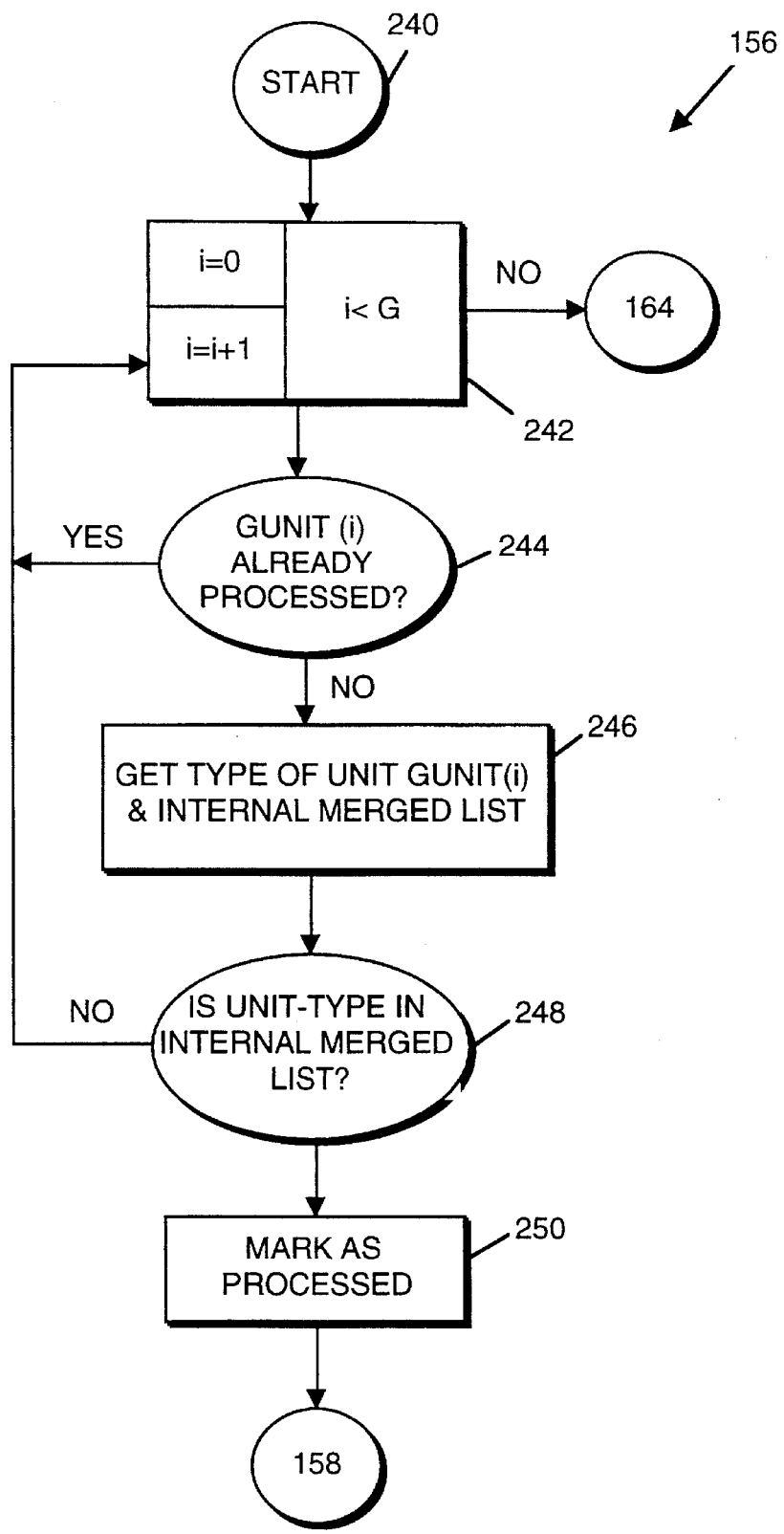
FIG. 17 is a flow diagram illustrating the "needs grouping?" step of FIG. 12.

FIG. 17 illustrates the "needs grouping?" step 156 of FIG. 12. The process 156 begins at 240, and an interative loop step 242 initializes a counter i to zero. A decision step 244 determines whether the first group unit, i.e., GUNIT(i) is already processed. If so, the counter i is incremented in a step 242 and is compared to the number of groups G in the queue. If the counter i is greater than or equal to G, the process control is returned to step 164 of FIG. 12. If not, the step 244 is repeated with the next GUNIT(i). If a GUNIT(i) has been found that has not already been processed, a step 246 retrieves the type of unit GUNIT(i) in its internal merged list. Next, in a step 248, it is determined whether the unit type of GUNIT(i) is in the internal merged list. If not, process control is returned to step 242 and the counter i is incremented. If the unit type is in the internal merged list, step 250 marks the unit as processed and returns process control to step 158 of FIG. 12, i.e., the unit is passed to each recognition domain in the internal list.

Figure 18:
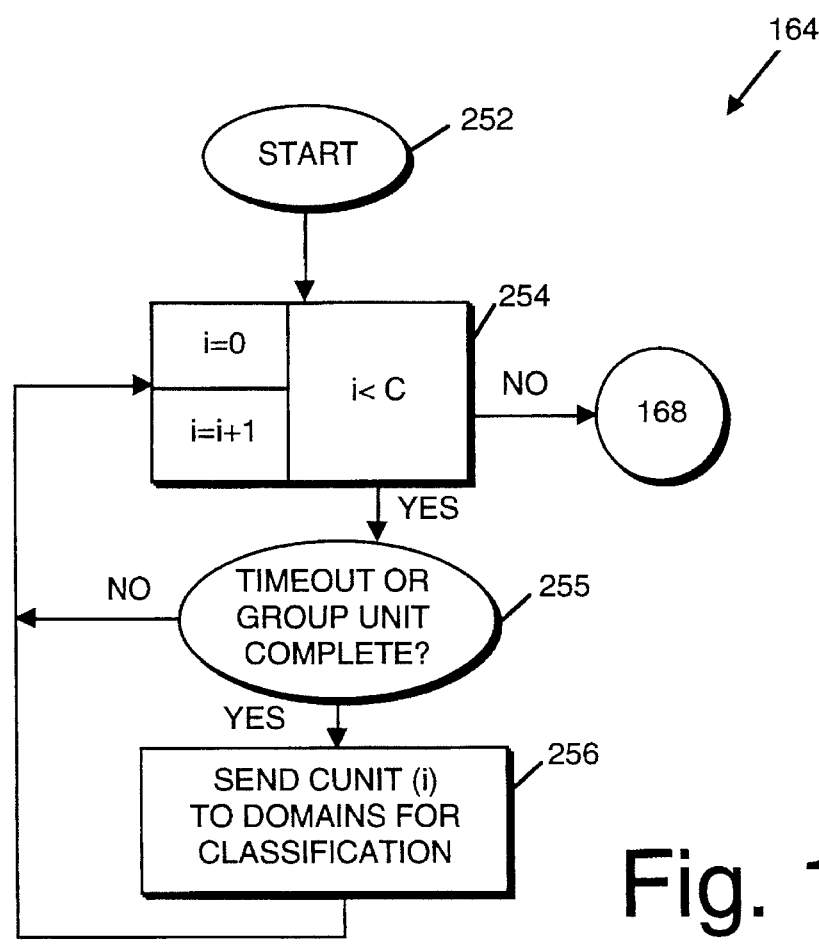
FIG. 18 is a flow diagram illustrating the "needs classification?" step of FIG. 12.

FIG. 18 illustrates the step 164 "needs classification?" of FIG. 12 in greater detail. The process 164 begins at 252, and in an interative loop step 254 a counter i is set to zero. If step 255 determines that there is a timeout, or if the group unit is complete, then a step 256 sends the first classification unit CUNIT(i) to the recognition domains for classification. Otherwise the counter i is incremented by iterative loop step 254. After all of the timed out or coupled groups have been sent to the recognition domains, the process control is returned to 168 on FIG. 12.

Figure 19:
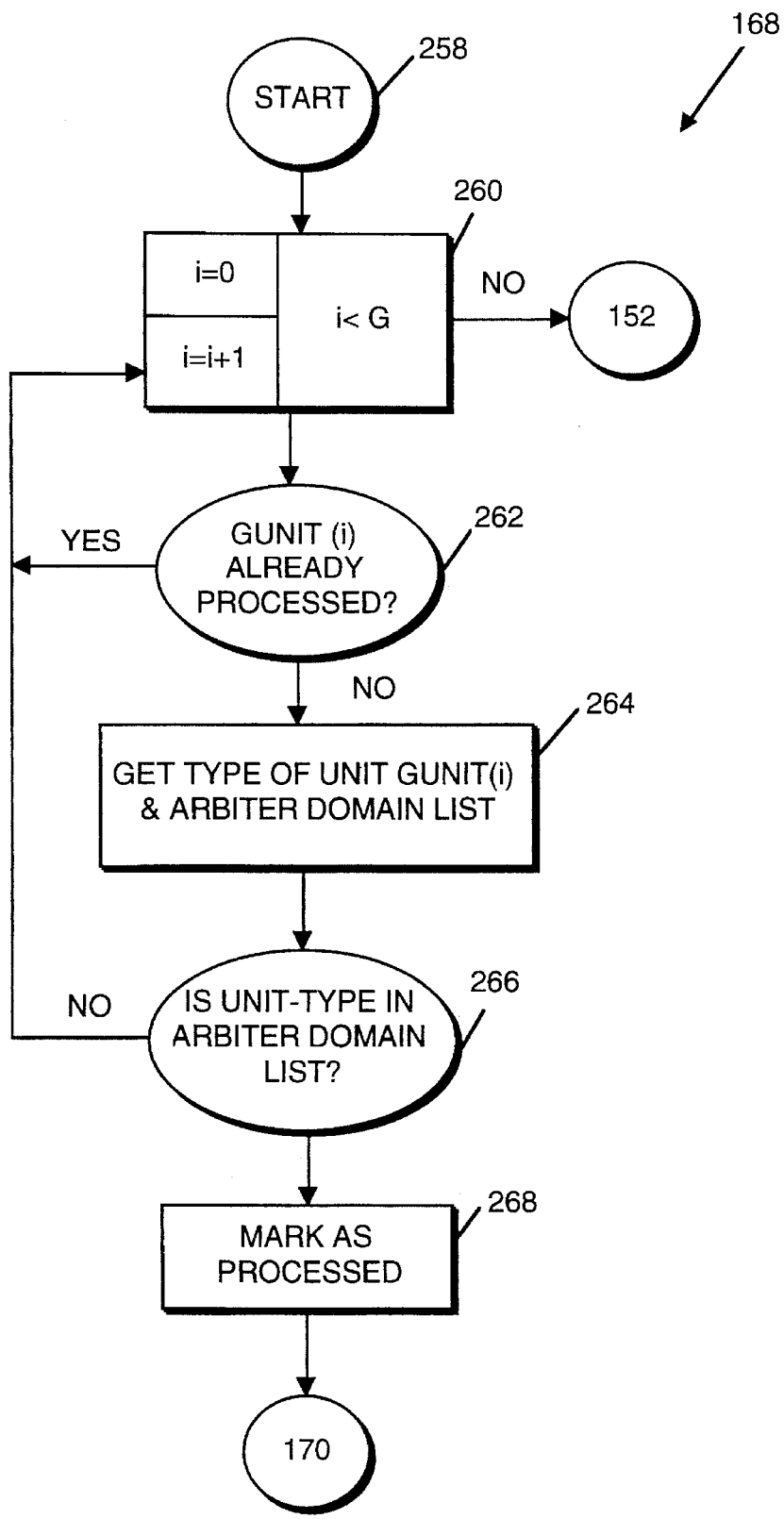
FIG. 19 is a flow diagram illustrating the "needs arbitration?" step of FIG. 12.

FIG. 19 illustrates the "needs arbitration?" step 168 of FIG. 12 in greater detail. The process 168 begins at 258, and a counter i is initialized to zero. The counter i is compared with the number of groups G to be processed, and if i is less than G a decision step 262 determines whether the first group unit GUNIT(i) has been already processed by the arbiter. If it has, process control is returned to step 260 and the counter i is incremented. If GUNIT(i) has not already been processed, a step 264 retrieves the type of unit GUNIT(i) and the arbiter domain list. A decision step 266 determines whether the unit-type is found in the arbiter domain list, and if it is not process control is returned to step 260 and the counter i is incremented. If the unit type is found in the arbiter domain list, it is marked as processed in step 268 and process control is returned to step 170 of FIG. 12.

Figure 20:
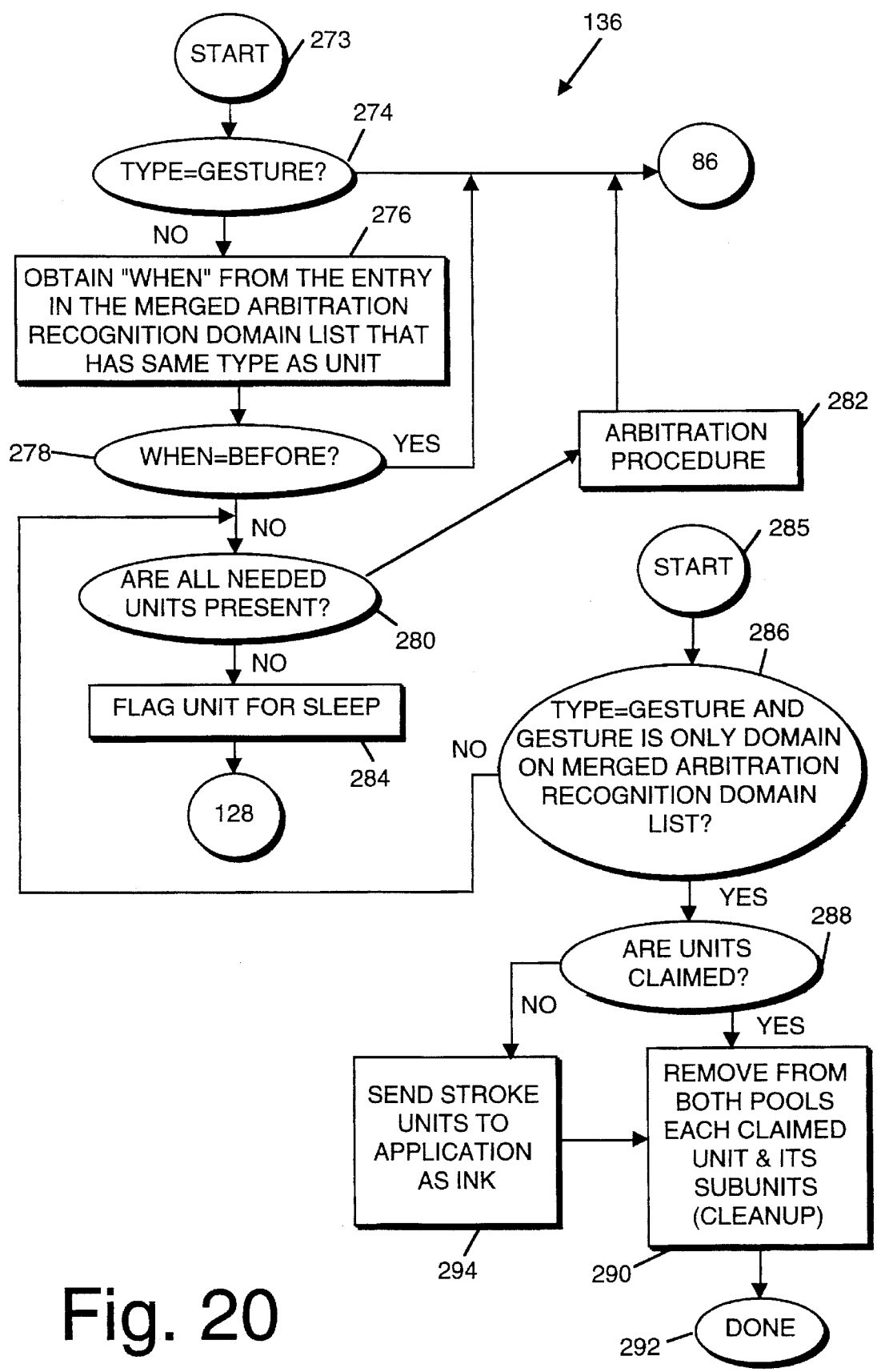
FIG. 20 is a flow diagram illustrating the process performed by the arbiter of FIG. 8.

FIG. 20 illustrates the processes undertaken by the arbiter 136 of FIG. 8. The process begins at 273 by being passed a unit from either the controller or the application program. Assuming that the unit is first passed by the controller 128, a step 274 determines whether the type of unit is a gesture. If it is, process control is turned over to the recognition interface 86 so that it may be passed to the application program 88 (see FIG. 3). If the type is not a gesture, the flag "when" is retrieved from the entry in the merged area arbitration recognition domain list that has the same type as the unit in a step 276. If the flag "when" is equal to "before" as determined by step 278, the unit is then passed to the recognition interface 86. If the flag "when" is not equal to "before," a step 280 determines whether all needed units are present. If they are, a step 282 performs an arbitration procedure and passes the unit to the recognition interface 86 as indicated at 285. If not all needed units are present, the current unit is flagged for sleep in a step 284 and process control is returned to the controller 128. The process 136 of FIG. 20 can also be initiated by the passing of a unit from the recognition interface 86. If a unit is received from that direction, a step 286 determines whether the type is a gesture and whether the gesture is the only domain on the merged area arbitration recognition domain list. If the result of the decision step 286 is "no" then process control is turned to step 280. If the result of the decision step 286 is "yes", a step 288 determines whether all units are claimed, and if they are, a step 290 removes from the classification and grouping & arbitration pools each unit claimed and its subunits in a cleanup process. The process is then completed as indicated at 292. If the units are not claimed as determined by step 288, the stroke units are sent back to the application program via the recognition interface 86 as "ink," and then steps 290 and 292 are performed.

Figure 21:
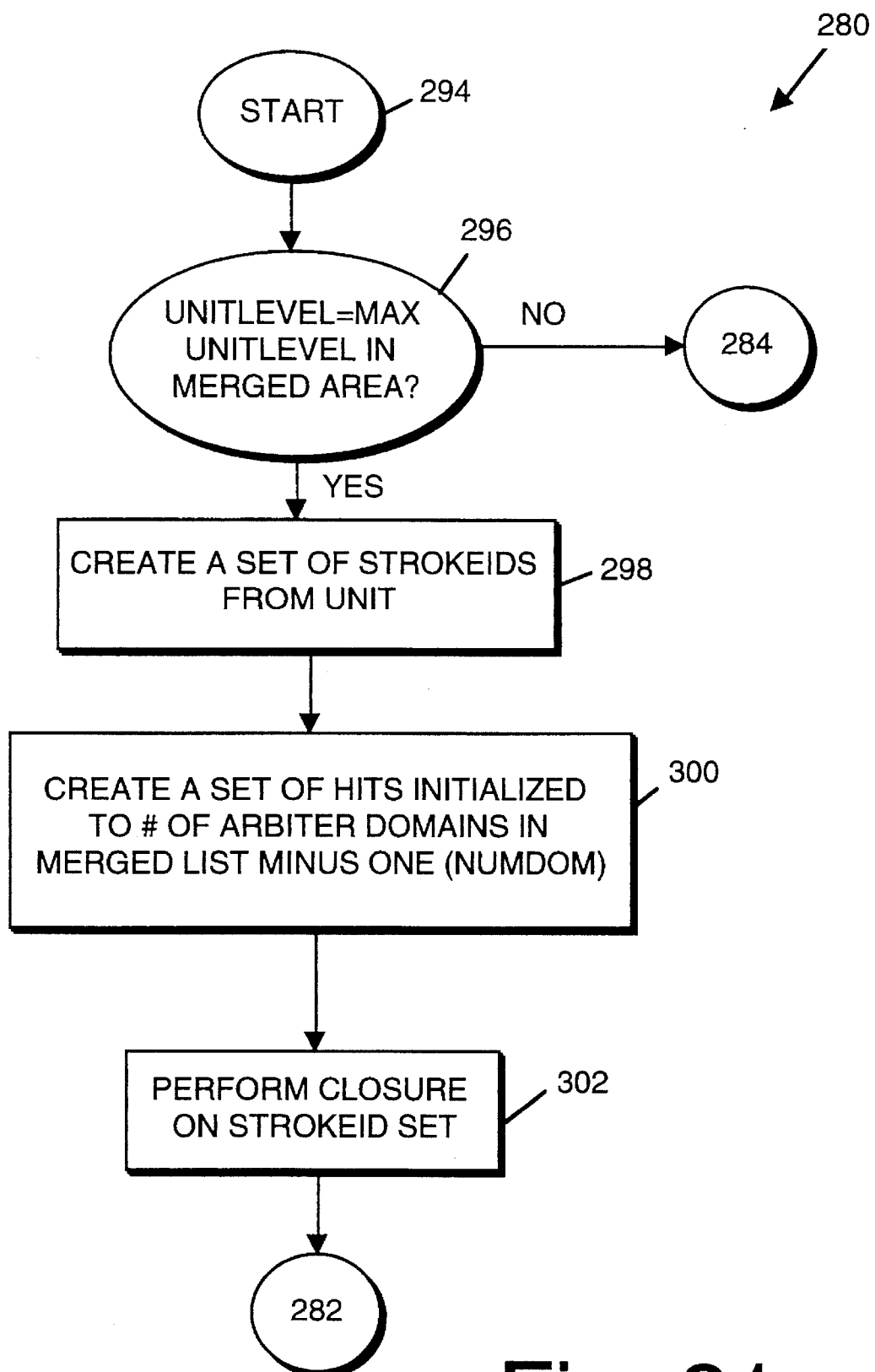
FIG. 21 is a flow diagram illustrating the step "are all needed units present?" of FIG. 20.

FIG. 21 illustrates the "are all needed units present?" step 280 of FIG. 20 in greater detail. The process 280 begins at 294, and a decision step 296 determines whether the unit level is equal to the maximum unit level in the merged area. Again, more will be said about these terms subsequently. If not, process control is returned to step 284 of FIG. 20. If the result of the decision step 296 is "yes," a set of STROKEIDs is created from the unit in a step 298, and a set of hits initialized to the number of arbiter domains in the merged list minus 1 (NUMDOM) is developed in a step 300. Next, in a step 302, closure is performed on the STROKEID set, and process control is returned to step 282 of FIG. 20. The "closure" step will be discussed in greater detail with reference to FIG. 23.

Figure 22:
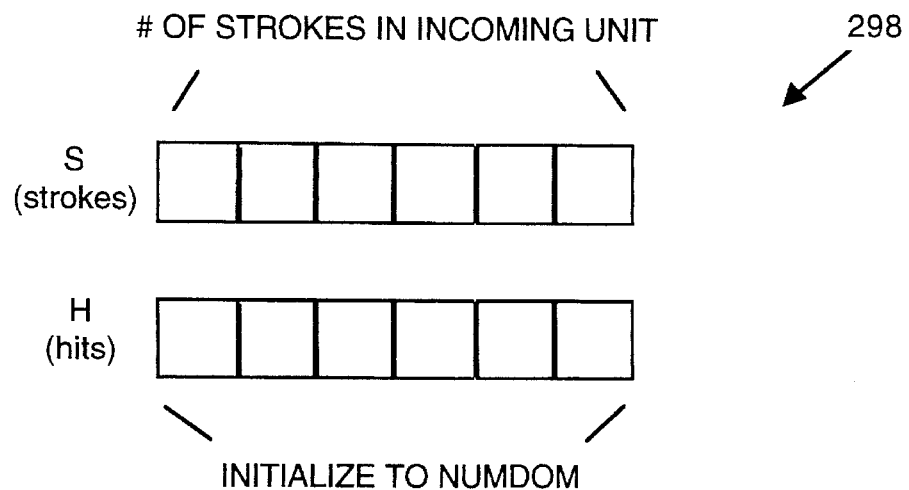
FIG. 22 illustrates the method of creating a set of strokes of FIG. 21.

FIG. 22 is used to illustrate step 298 of FIG. 21. Two sets are created, namely: a first set S for strokes, and a second set H for hits. The S set is initialized to the number of strokes of the incoming unit, and the H set is initialized to the number of domains minus 1 (NUMDOM).

Figure 23:
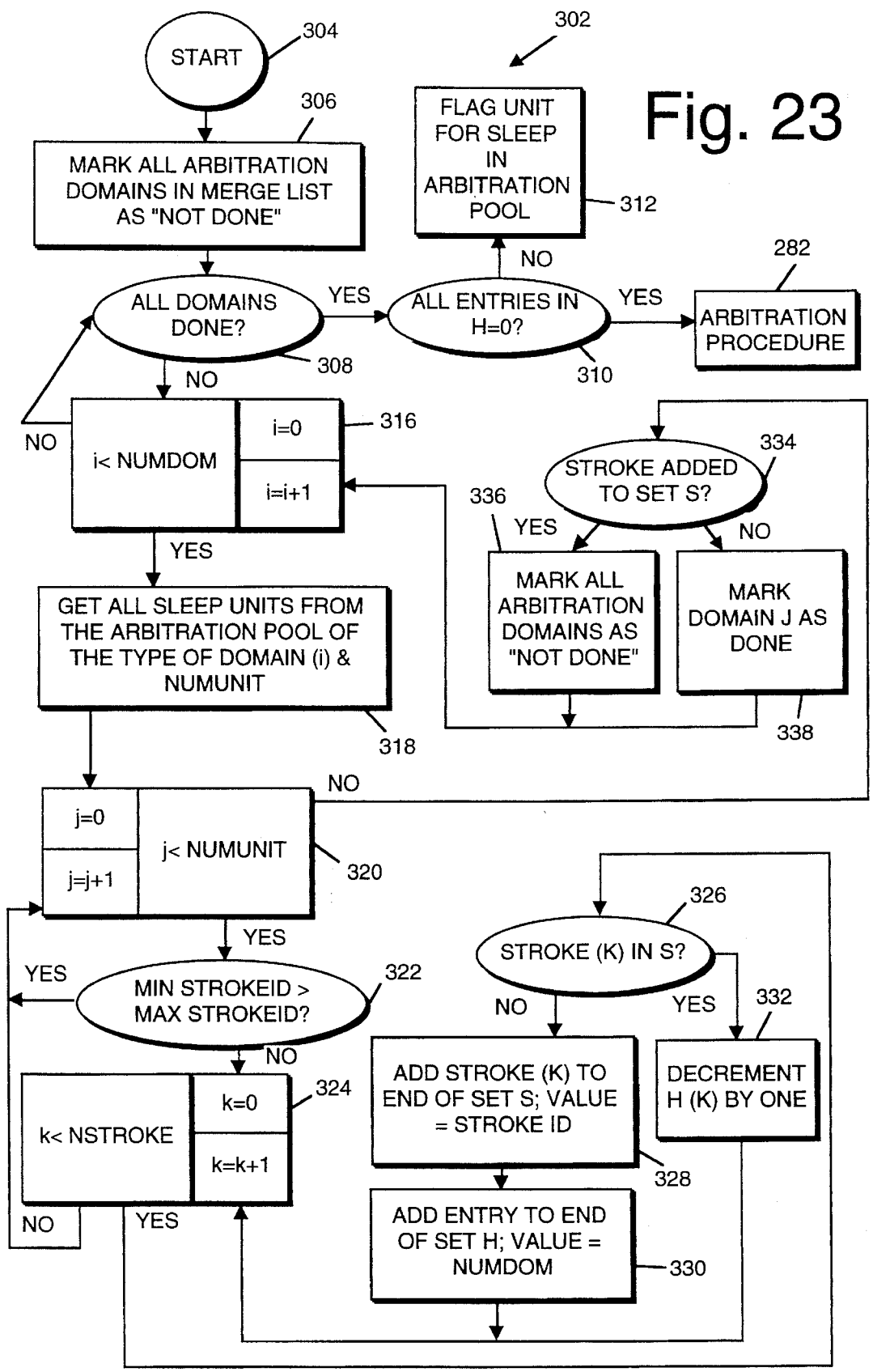
FIG. 23 is a flow diagram illustrating the "perform closure on graph" step of FIG. 21.

FIG. 23 illustrates the "perform closure on STROKEID set" step 302 of FIG. 21 in greater detail. The process begins at 304, and a step 306 marks all arbitration domains in the merge list as "not done." A step 308 then determines whether all domains are done and, if they are, a decision step 310 determines whether all entries in the hit list H are equal to zero. If they are not, the unit is put to sleep in the arbitration pool in a step 312 and, if they are, there is an arbitration procedure performed on the arbitration pool in step 282.

If step 308 determines that all domains are done, an interative loop step 316 is commenced by initializing a counter i to zero. A step 318 retrieves all sleep units from the arbitration pool of the type domain (i) and NUMUNIT, and then an interative loop step 320 is initiated by setting a counter j to zero. If j is less than the number of units NUMUNIT, a step 322 determines whether minSTROKEID is greater than maxSTROKEID. If it is, process control is returned to step 320 and the counter j is incremented. If it is not, an interative loop step 324 is commenced by initializing a counter k to zero and by comparing the counter k to with the number of strokes NSTROKE. If k is less than NSTROKE, a step 326 determines whether stroke(k) is in the set S. If it is, H(k) is decremented by one and process control is returned to step 324 and the counter k is incremented by one. If the stroke(k) is not in S, stroke(k) is added to the end of set S where the value of the added stroke is equal to STROKEID. Next, in a step 330, the entry is added to the end of set H, where the value is equal to NUMDOM. Process control is then returned to step 324 and the counter k is incremented.

When k is greater than or equal to NSTROKE in step 324, process control is returned to step 320 and the counter j is incremented. When the counter j is greater than or equal to NUMUNIT as determined by step 320, a step 334 determines whether the stroke is added to set S. If it is, all arbitration units are marked as "not done" in a step 336 and process control is returned to step 316 and the counter i is incremented. If the stroke is not added to set S as determined by step 334, a step 338 marks the domain J as done and returns process control to step 316 to increment the counter i. When the counter i is equal to or greater than NUMDOM as determined in step 316, process control is returned to step 308 to determine whether all domains have been completed.

Figure 24:
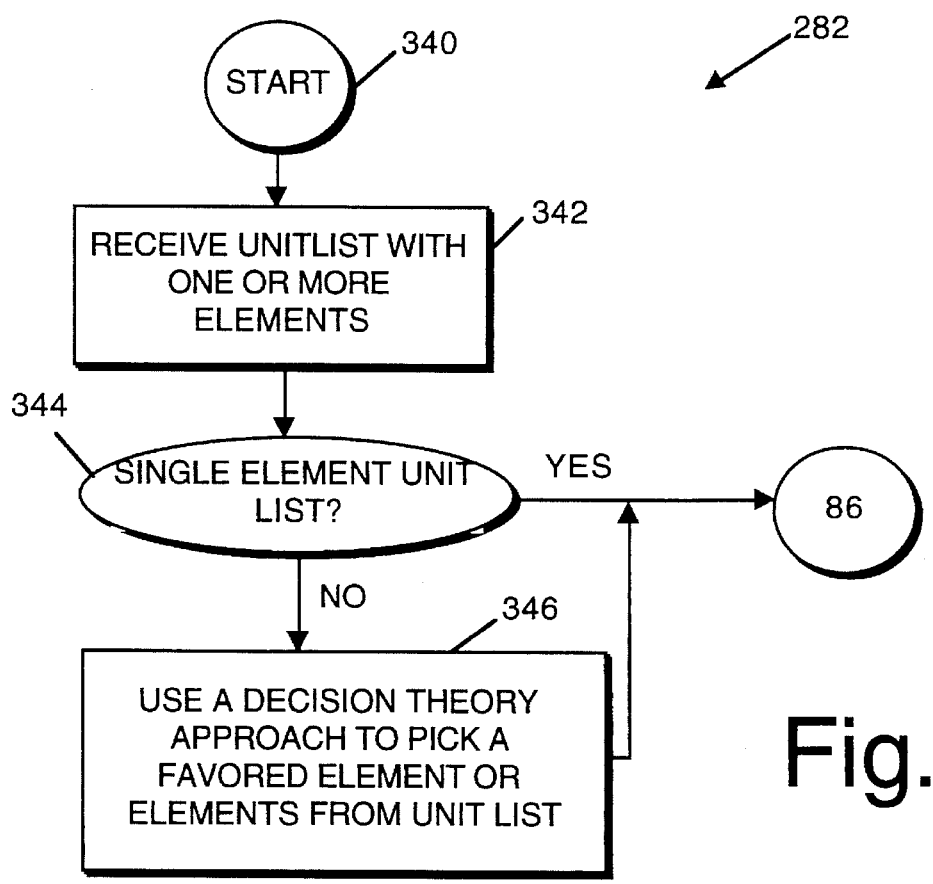
FIG. 24 is a flow diagram illustrating the arbitrate step of FIG. 20.

FIG. 24 is a flow diagram illustrating the arbitration procedure 282 of FIG. 20 in greater detail. The process 282 begins at 340, and a step 342 receives the unit list with one or more elements. A step 344 determines whether the unit list contains only a single element, and if it does it is sent to the recognition interface 86. If the unit list contains multiple elements, a decision theory approach is used to pick a favorite element or elements from the unit list in a step 246 before sending the favored dement or elements to the recognition interface 86.

Figure 25:
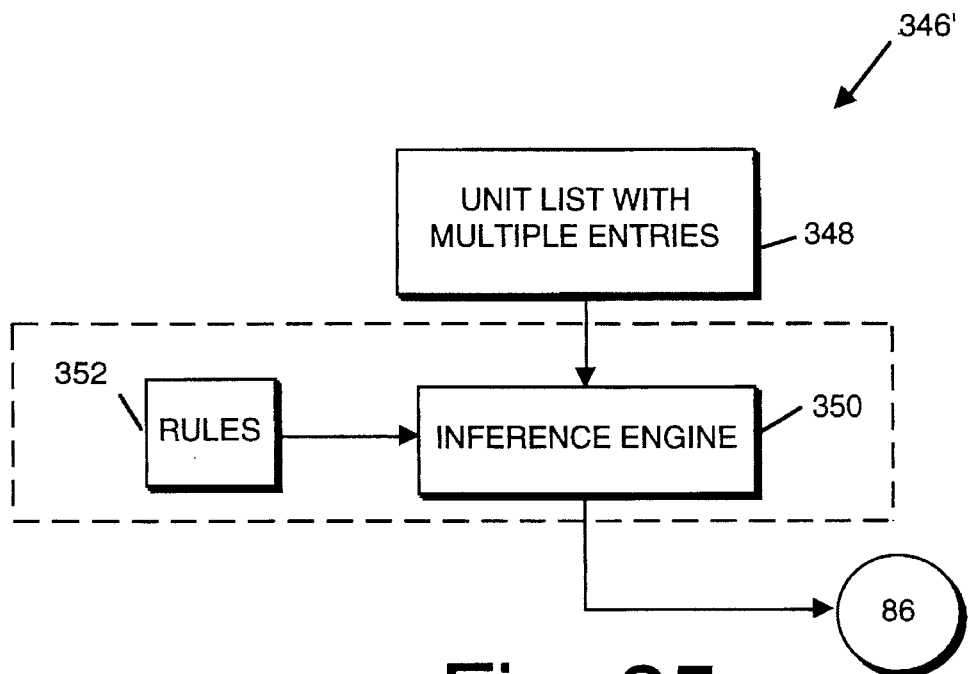
FIG. 25 illustrates the "use a decision theory" step of FIG. 24.

FIG. 25 illustrates one type of decision theory known as an "expert system." The expert system 346' receives the unit list with multiple entries 348 into an inference engine 350. Rules 352 are used to process the multiple entries within the inference engine to provide the favored unit. The operation of expert system such as the expert system 346 are well known to those skilled in the art. See, for example, *Rule-Based Expert Systems: The MYCIN Experiments of the Heuristic Programming Project*, Buchanan, B. G. & Shortliffe, E. H., Addison-Wesley, 1983.

OPERATIONAL EXAMPLE

The following operational example will be used to further clarify the operation of the high-level recognition sub-system 82 of the present invention. Due to the complexity of the system, this example will be necessarily simplified, as will be appreciated by those skilled in the art.

Figure 26:
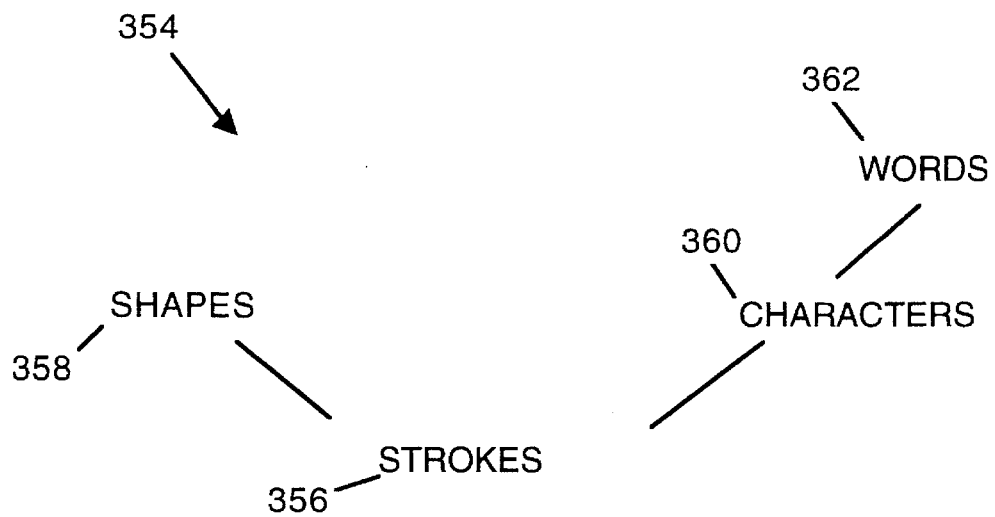
FIG. 26 illustrates a possible recognition domain hierarchy for an operational example.

FIG. 26 illustrates the hierarchy of units 354 as defined by the hierarchy of recognition domains that will be used in this operational example. At the lowest level, there are stroke units 356, and one level up there are shape units 358 and character units 360. At the highest level in this example, there are word units 362. The word units 362 depend upon character units 360 which, in turn, depend upon stroke units 356. The shape units 358 depend only upon the stoke units 356.

Figure 27:
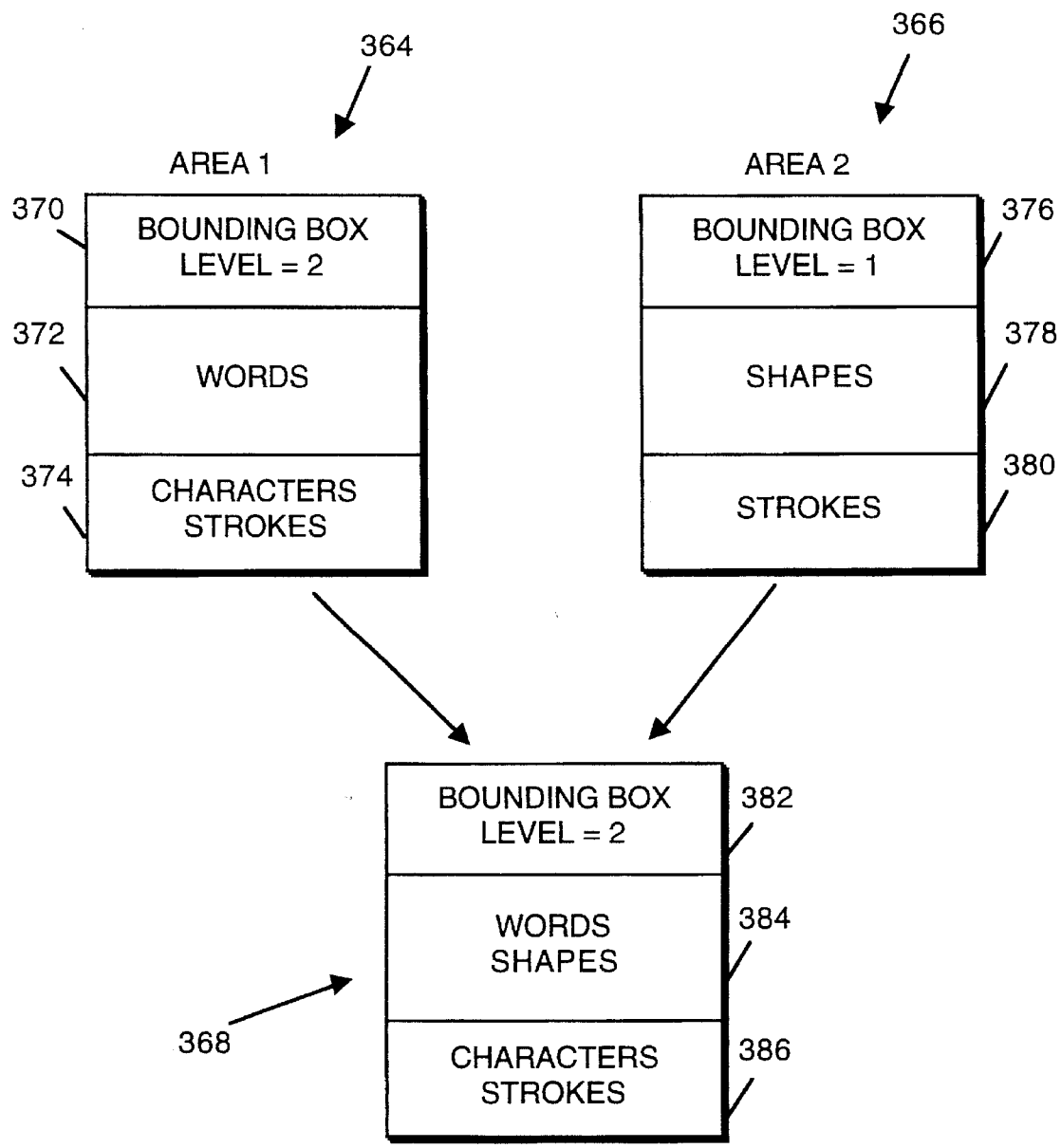
FIG. 27 illustrates areas defined for the operational example.
Figure 29A:
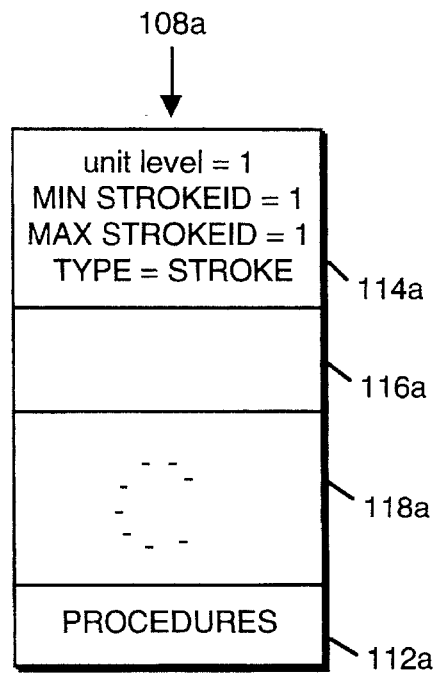
FIGS. 29a–29d illustrate four stroke units created by the strokes of FIG. 28.
Figure 29B:
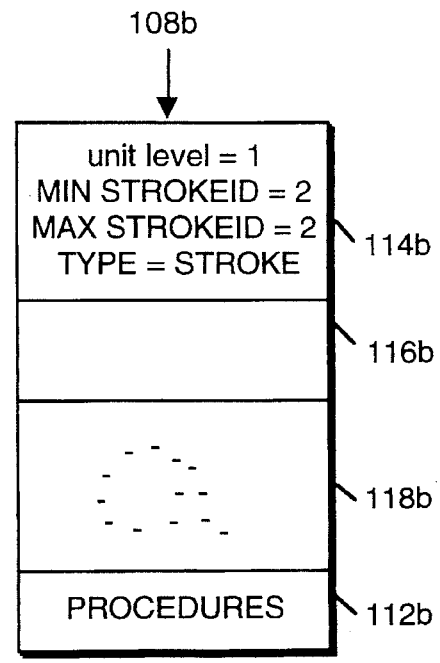
Figure 29C:
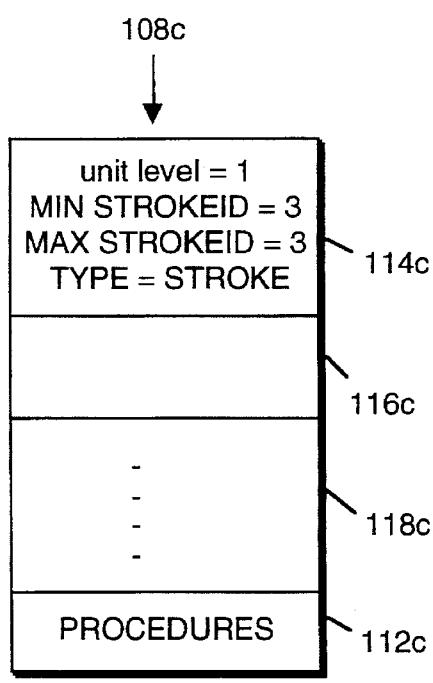
Figure 29D:
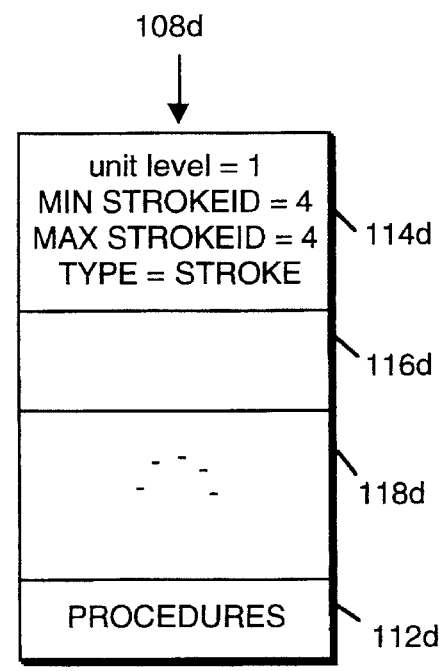

FIG. 27 illustrates the areas defined for this example. For an Area 1 where words are to be recognized, a recognition area object 364 is created and for an Area 2 where shapes are to be recognized, a recognition area object 366 is created. Objects 364 and 366 area merged to create a merged area object 368. Recognition area object 364 has a data area 370 including the bounding box coordinates for Area 1 and its level in the hierarchy (where level=2 for Area 1 in this example). The arbiter recognition domain list 372 for Area 1 is "words" and the internal recognition domain list 374 comprises "characters". Recognition area object 366 includes a data area 376 including the bounding box coordinates for Area 2 and its level in the hierarchy (where level=1 for Area 2 in this example). The arbiter recognition domain list 378 of object 366 includes "shapes" and the internal recognition domain list 380 includes "strokes".

In this example, Area 1 and Area 2 coincide, i.e. they have the same bounding box coordinates. In the merged area object 368, a data area 382 including the bounding box coordinates of the merged area and the highest level number (i.e. level=2). An arbiter recognition domain list 384 includes "words" and "shapes", and an internal recognition domain list 386 includes "characters" and "strokes".

Figure 28:
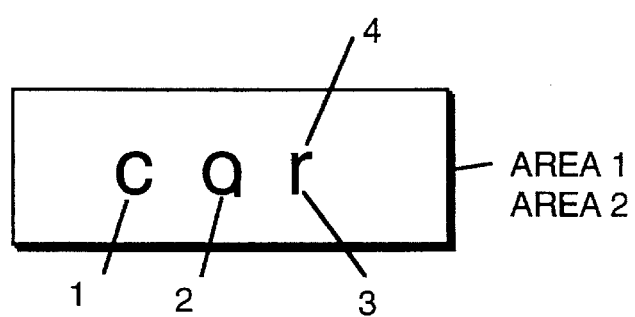
FIG. 28 illustrates the bounding box for the screen areas with strokes making the word "car"

FIG. 28 shows the bounding box for Area 1 and Area 2 on a screen 42 of a computer system 10. Four strokes are made with stylus 38 on the screen 42 within the bounding box of Area 1 and Area 2, namely, a "c" stroke, an "a" stroke, a first part of an "r" stroke, and a second part of an "r" stroke. These four strokes are labeled 1, 2, 3, and 4 in FIG. 28. The object of the high-level recognition sub-system is to recognize the word "car" from this series of four strokes.

FIGS. 29a, 29b, 29c, and 29d illustrate the four stroke units 108a–108d created by system 10 for the four strokes 1, 2, 3, and 4 in FIG. 28. The generic data portions 114a–114d include the unit levels (all of the stroke units have a unit level=1), minSTROKEID, maxSTROKEID, and type (all are type=STROKE). The minSTROKEID and maxSTROKEID is equal to the stroke number for each stroke. Since strokes have no sub-units, the sub-unit data area 116a–116d are all empty. The interpretation data for the four strokes are stored in areas 118a–118d, and the procedures for the objects 108a–108d are in areas 112a–112d.

Figure 30:
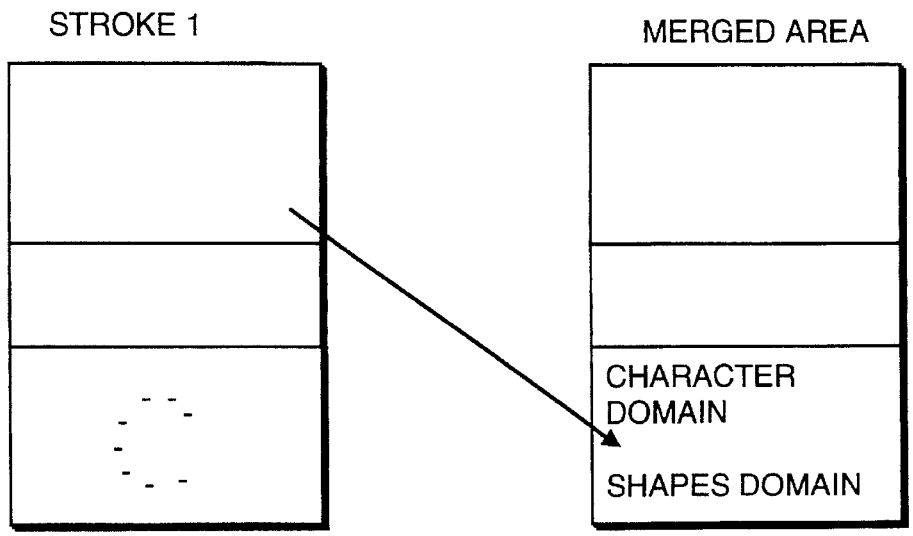
FIG. 30 illustrates the pointing of Stroke 1 to the internal list of the merged area.

Once the recognition areas 130 (FIG. 8) of the high-level recognition sub-system 82 are set-up as indicated in FIG. 27, the controller 128 is ready to receive the first stroke (i.e. the "c" stroke). The process implemented by the controller 128 is shown in FIG. 12. Since the new ("incoming") stroke is a new stroke unit, the AREALIST of the unit is filled in in a step 154 resulting in the object shown in FIG. 29a. Next, step 156 determines that the new stroke unit needs grouping in a step 156, and the unit is sent to the recognition domains 158. As seen in FIG. 30, the Stroke Unit 1 is of type STROKE, which is in the internal list of the merged area. Therefore, Stroke Unit 1 is sent to both the CHARACTER and to the SHAPES recognition domains in step 158.

Figure 31:
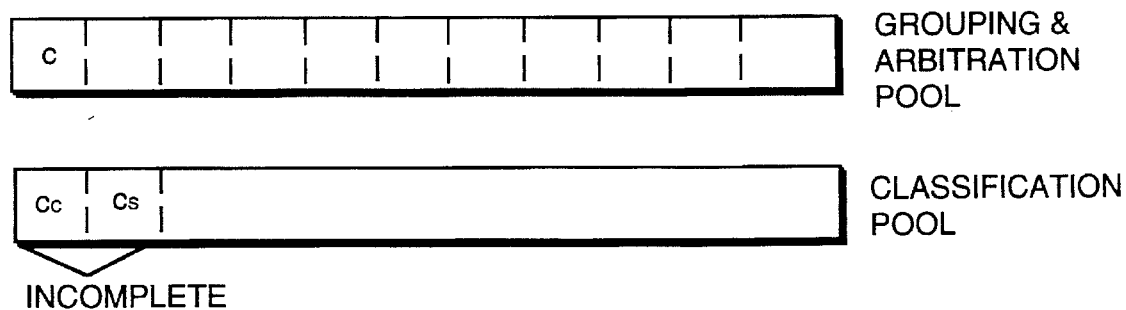
FIG. 31 illustrates the grouping & arbitration pool and the classification pool at this point in the process.

As seen in FIG. 31, when an incoming unit is received it is automatically placed in the grouping and arbitration pool. Step 160 also places new groups in the classification pool after the unit has been sent to the recognition domains in step 158. Since the incoming unit (the "c" stroke) was sent to both the character and the shape recognition domains, there are two entries into the classification pool, namely $c_c$ from the character recognition domain and $c_s$ from the shape recognition domain. Both of these entries include their list of possible interpretations for the stroke, and both of the entries into the classification pool are marked as "incomplete" at this time. Therefore, the grouping & arbitration pool and the classification pool will appear as in FIG. 31 after step 160 of FIG. 12 is performed after the first stroke "c" is entered into the system.

Figure 32:
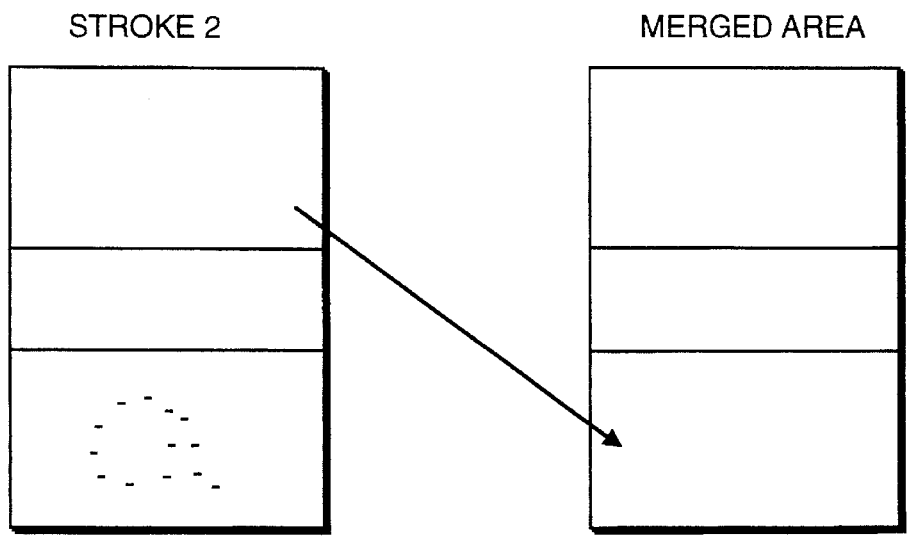
FIG. 32 illustrates the pointing of Stroke 2 to the internal list of the merged area.

FIG. 32 illustrates the result when a second stroke, i.e. the "a" stroke is entered into the system. Again, a stroke unit is formed as previously described, which in this case is Stroke Unit 2. The type of the unit is STROKE, so the mapping into the merged area again results in the recognition domains CHARACTER and SHAPES being designated as the appropriate recognition domains.

Figure 33A:
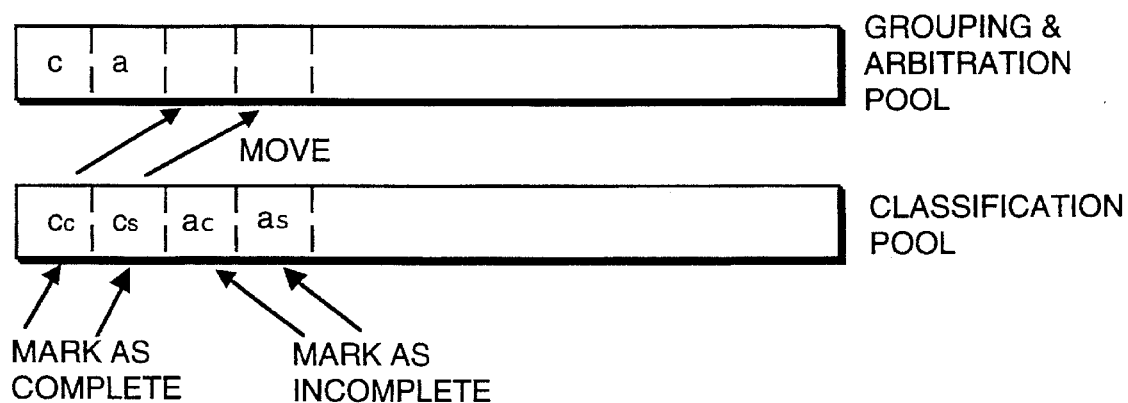

As illustrated in FIG. 33a, the "a" stroke is automatically entered into the grouping & arbitration pool upon entry into the system. Step 154 (FIG. 12) fills in the AREALIST of the Stroke Unit 2 (FIG. 32). Since the "a" stroke once again needs grouping (step 156) it is sent to the recognition domains in step 158. Step 160 causes the $c_c$ and $c_s$ entries in the classification pool to be marked as "complete" and are moved from the classification pool to the grouping and arbitration pool. The CHARACTER and SHAPES recognition domains enter $a_c$ and $a_s$ into the classification pool and marks them as incomplete.

In FIG. 33b, the status of the pools after step 167 (FIG. 12) is completed is illustrated. The grouping & arbitration pool includes the entries "c", "a", "$c_c$", and "$c_s$", where the latter two entries include a list of interpretations. The classification pool includes the entries "$a_c$" and "$a_s$", which are marked as incomplete.

Next, it is determined by the step 280 of FIG. 20 that not all units needed are present for the entry "$c_s$" in the grouping & arbitration pool. This causes the entry "$c_s$" to be flagged for sleep in a step 284. The result of these steps is illustrated in FIG. 33c.

At this point, stroke number 3 (the vertical section of the letter "r") enters the system as an incoming stroke. FIG. 34 illustrates the formation of a stroke unit for stroke 3, and the link of stroke 3 to the merged area unit as described previously. Again, the merged area unit of FIG. 34 indicates that the appropriate recognition domains are CHARACTERS and SHAPES.

Figure 35A:
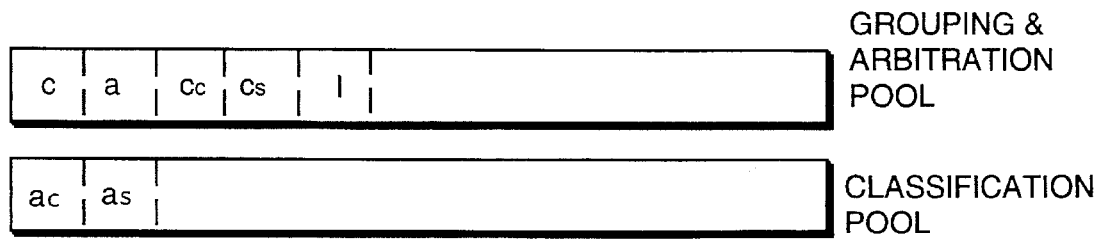
FIGS. 35a–35c illustrate the grouping & arbitration pool and the classification pool at this point in the process.
Figure 35B:
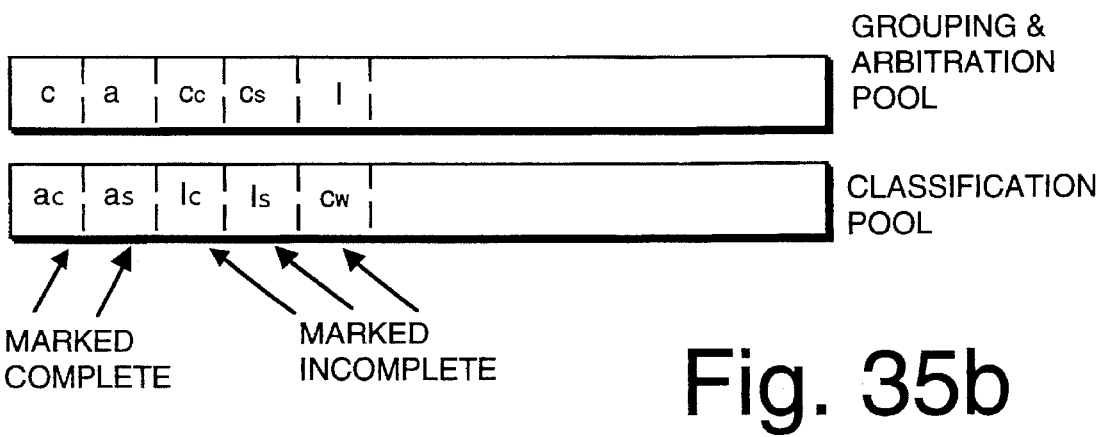

FIG. 35a illustrates the grouping & arbitration pool and the classification pool just after the incoming stroke 3 is received. Step 35b illustrates the status of these two pools after step 160 of FIG. 12 is completed. The grouping and arbitration pool includes the members "c", "a", "$c_c$", "$c_s$", and "l", and the classification pool includes the members "$a_c$", "$a_s$", "$l_c$", "$l_s$", and "$c_w$". Members "$a_c$" and "$a_s$" are marked as "complete" while "$l_c$", "$l_s$", and "$c_w$" are marked as "incomplete". "$l_c$", "$l_s$" are the classifications for the stroke 3 ("l") returned by the CHARACTER and SHAPES recognition domains, respectively. "$c_w$" is the classification for the character "c" returned by the WORD recognition domain.

Figure 35C:
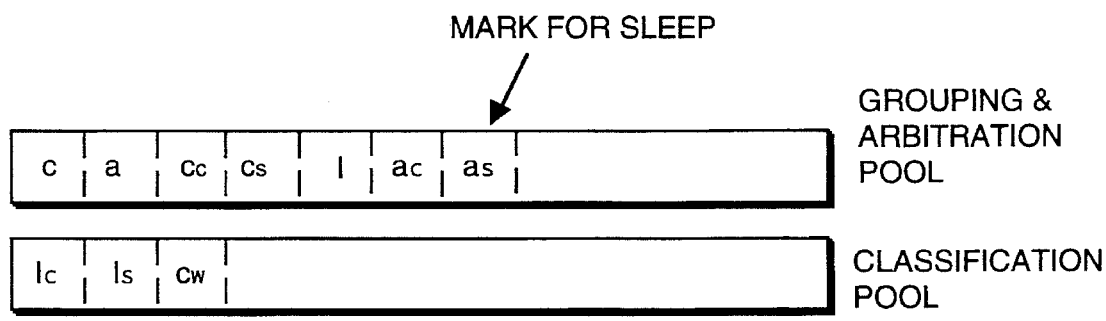

FIG. 35c illustrates the pools after the completion of step 167 and 170 of FIG. 12. Since the "$a_c$" and "$a_s$" members of the classification pool were marked as complete, they were moved to the grouping & arbitration pool by step 167. The member "$a_s$" of the grouping & classification pool was marked for sleep by step 170.

Figure 36:
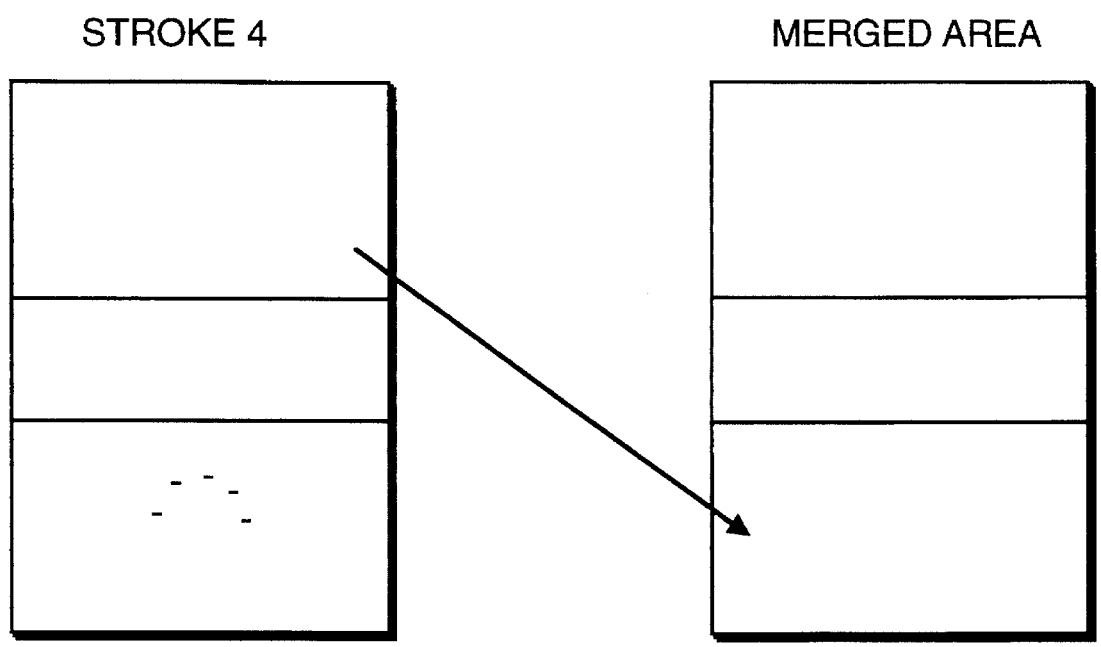
FIG. 36 illustrates the pointing of Stroke 4 to the internal list of the merged area.

FIG. 36 illustrates the result of the final incoming Stroke 4, namely the curved portion of the letter "r". As before, a stroke unit is created for the portion of a letter, and the merged area is accessed to determine the appropriate recognition domains which, as before, are the CHARACTERS and SHAPES domains.

Figure 36A:
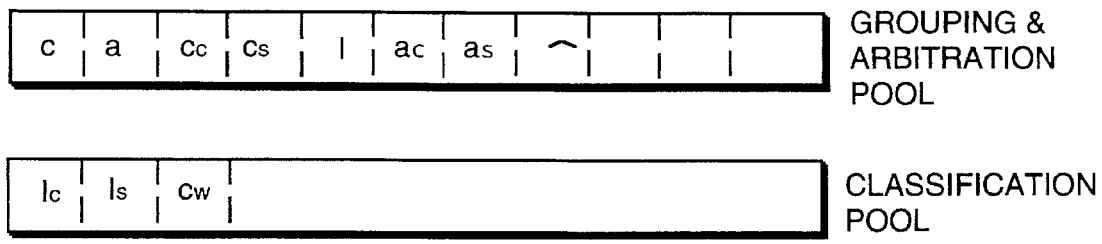
FIGS. 36a–36f illustrate the grouping & arbitration pool and the classification pool at this point in the process.

FIG. 36a illustrates the condition of the grouping & arbitration pool and the classification pool after receiving this last incoming Stroke 4. The grouping and arbitration pool includes the members "c", "a", "$c_c$", "$c_s$", "l", "ac", "as", and "" (where "" represents the curved Stroke 4) and the classification pool includes the members "$l_c$", "$l_s$", and "$c_w$".

Figure 36B:
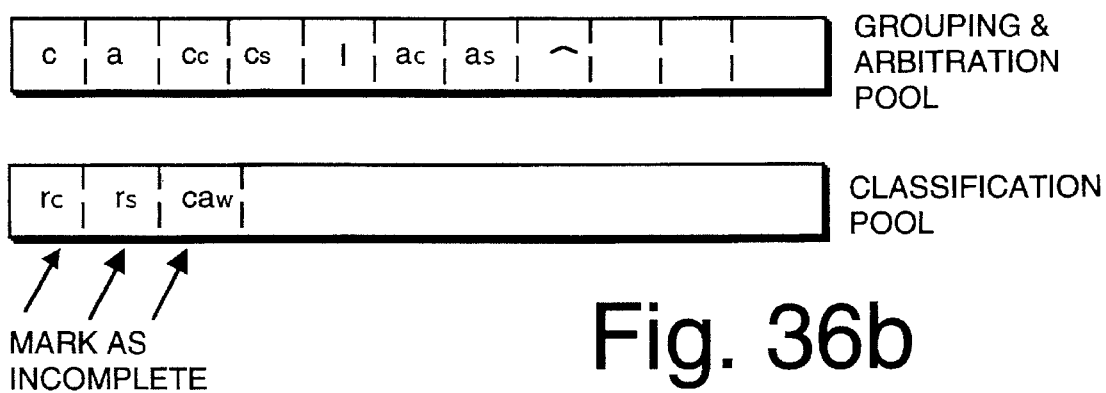

After step 160 of FIG. 12 is performed, the pools look as illustrated in FIG. 36b. The grouping & arbitration pool area as in FIG. 36a, but the classification pool has been modified to include the members "$r_c$", "$r_s$", and "$ca_w$" from the CHARACTERS, SHAPES, and WORDS recognition domains, respectively. All members of the classification pool of FIG. 36b are marked as "incomplete".

Figure 36C:
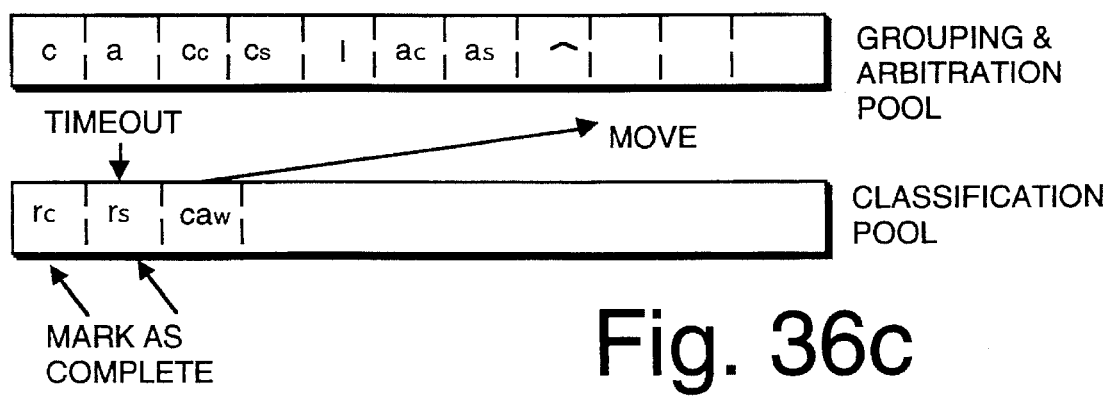
Figure 36D:
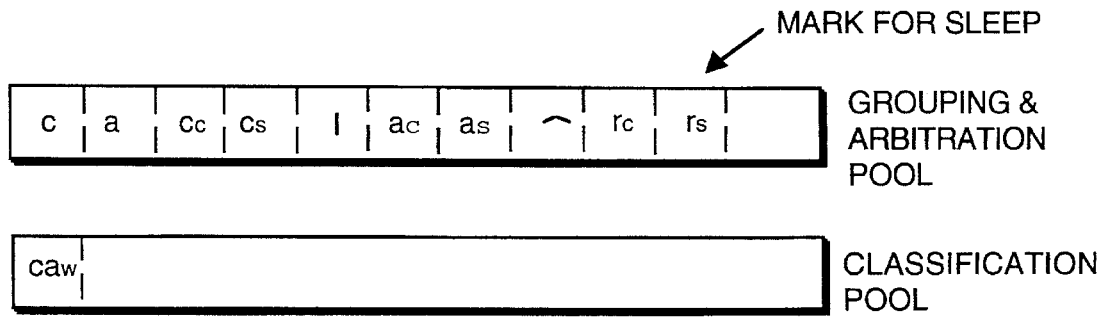

Next, the members "$r_c$" and "$r_s$" of the classification pool are marked as "complete" by the CHARACTERS and SHAPES recognition domains, respectively, and are moved to the grouping and arbitration pool by step 167 (FIG. 12). This step, which is illustrated in FIG. 36c, leaves only the member "$ca_w$" in the classification pool, and results in a pool structure shown in FIG. 36d. The member "$r_s$" of the grouping & classification pool is marked for sleep by step 170.

Figure 36E:
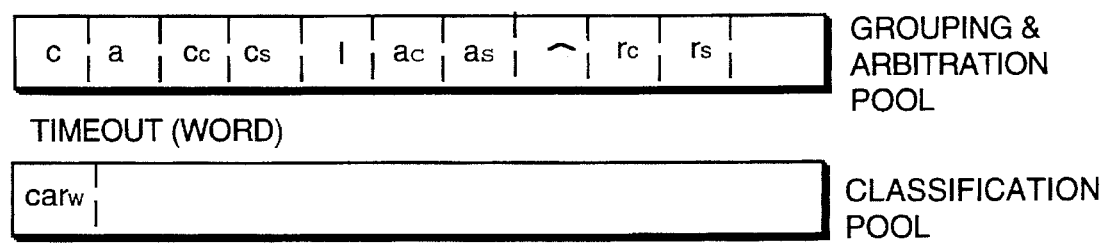
Figure 36F:
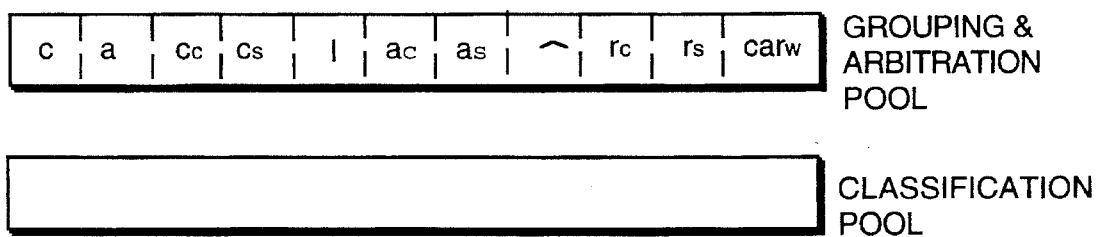

Next, assume that a timeout occurs because no stroke is entered after Stroke 4 for a predetermined period of time. Alternatively, a spaceout could occur if the next stroke entered is farther than a predetermined distance away from stroke 4. In this event, step 160 could place the single member "$car_w$" from the WORDS recognition domain into the classification pool as seen in FIG. 36e. The timeout (or spaceout) causes the member "$car_w$" to be marked as "complete" in the classification pool, and is moved to the grouping and arbitration pool by step 167 (FIG. 12) to result in an empty classification pool as seen in FIG. 36f.

FIG. 37 illustrates the word unit 388 for "$car_w$" which resulted from the preceding steps. The TYPE of the unit is Word, the LEVEL of the unit is 3, the minSTROKEID is 1, and the maxSTROKEID is 4. The variables minSTROKEID and maxSTROKEID hold the lowest and highest, respectively, stroke numbers which form a part of the word unit 388. The word unit 388 includes the sub-units "$c_c$", "$a_c$", and "rc", which are the recognized characters, "c", "a", and "r". The word unit 388 also includes the various interpretations for the word unit 388, namely "car", "ear", and "can", depending upon how the various characters were interpreted. Again, the various interpretations are ranked by the recognition domains, where the lower the rank, the higher the certainty that the interpretation is the correct one.

Figure 38:
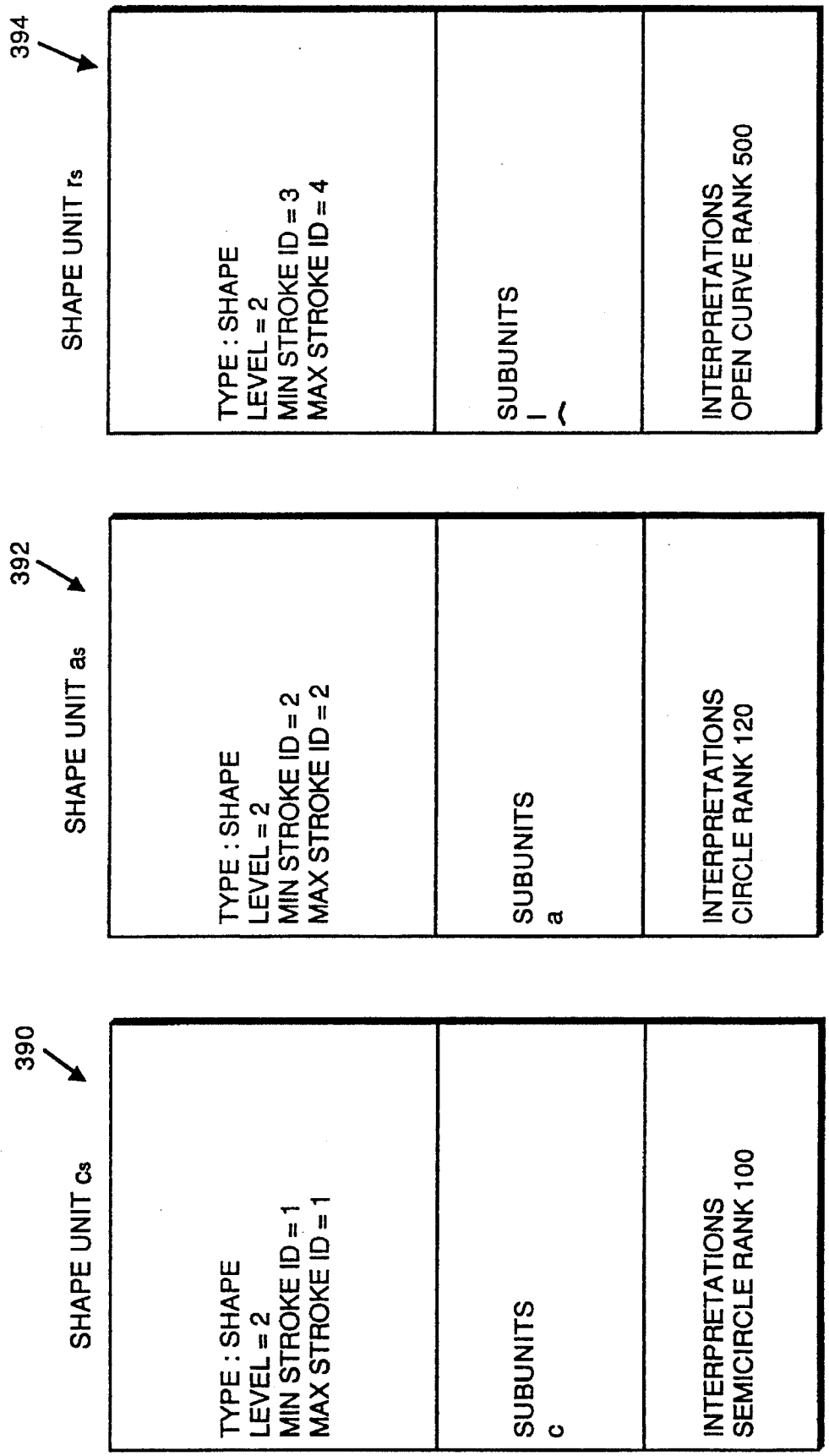
FIG. 38 illustrates three shape units generated by the process.

FIG. 38 illustrates the three shape units "$c_s$", "$a_s$", and "$r_s$" left in the grouping & arbitration pool. The shape unit 390 is of TYPE=shape, LEVEL=2, and minSTROKEID=maxSTROKEID=1. The sub-units of shape unit 390 only includes the stroke "c". The stroke "c" has been interpreted as a semicircle with a rank 100. The shape unit 392 is of TYPE=shape, LEVEL=2, and minSTROKEID=maxSTROKEID=2. The only sub-unit for shape unit 392 is a circle with a rank 120. The shape unit 394 is of TYPE=shape, LEVEL=2, minSTROKEID=3 and maxSTROKEID=4. The sub-units are the strokes "l" and "". The interpretation is that of an open curve with a rank 500.

Figure 39:
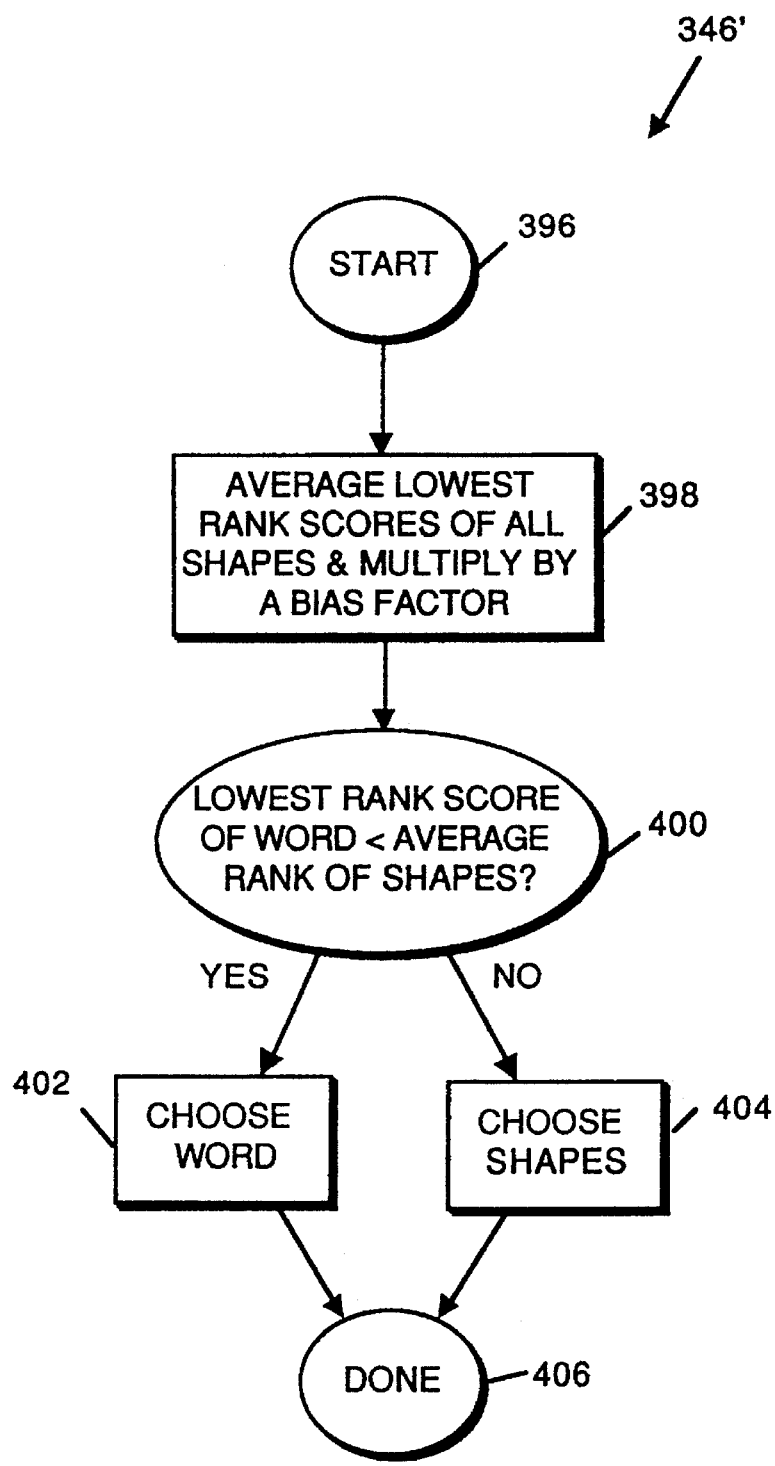
FIG. 39 is a flow diagram illustrating a method for choosing a "best-guess" recognition of the input strokes.

FIG. 39 illustrates step 346' of FIG. 25 in greater detail. The process 346' begins at 396, and the lowest ranked scores for all of the shape units 390–394 are averaged and are multiplied by a bias factor. A bias factor is simply a factor which correlates the scoring systems for the various recognition domains. Next, in a step 400, it is determined if the lowest rank score of the word unit 388 is less than the average of the lowest rank scores of the shape units 390–394. If the word unit 388 has the lowest rank, the word is chosen as the "best guess" in step 402 and the process is completed at step 406. Otherwise, the shapes are chosen as the "best guess" in a step 404 and the process is again completed at step 406.

While this invention has been described in terms of several preferred embodiments, there are alterations, permutations, and equivalents which fall within the scope of this invention. It is therefore intended that the following appended claims be interpreted as including all such alterations, permutations, and equivalents as fall within the true spirit and scope of the present invention.

What is claimed is:

1. A recognition system for a pen-based computer system having a stylus, a processing means capable of running an application program, and a display suitable for displaying an output directed by said application program, the recognition system comprising:

tablet means for inputting strokes from a stylus;

low level recognizer means responsive to said strokes inputted through said tablet means and operative to perform low level recognition on said strokes, including the recognition of a plurality of gestures, the low level recognizer means being capable of running on said processing means;

high level recognizer means independent of the low level recognizer means and responsive to stroke objects that are not recognized by said low level recognizer and operative to perform high level recognition on strokes that are not recognized by said low level recognizer, the high level recognizer means being capable of running on said processing means; and a recognition interface permitting independent communication between said low level recognizer means and an application program, and permitting independent communication between said high level recognizer and said application program to permit the application program to utilize recognized information to direct the output to said display;

whereby processing efficiency is increased by permitting the low level recognizer to recognize certain stroke objects and not requiring stroke objects recognized by the low level recognizer to be handled by the high level recognizer and thereby avoiding at least some preprocessing that is required by the high level recognizer.

2. A recognition system as recited in claim 1 wherein said low level recognizer means recognizes gestures made with said stylus on said tablet means.

3. A recognition system as recited in claim 1 wherein said high level recognizer means comprises:

controller means; and a plurality of recognition domains coupled to said controller means.

4. A recognition system as recited in claim 3 wherein said high level recognizer further includes arbitration means coupled to said controller means for resolving multiple interpretations provided by said plurality of recognition domains.

5. A recognition system as recited in claim 4 wherein said high-level recognizer further includes database means coupled to said controller means.

6. A recognition system as recited in claim 5 wherein said high-level recognizer further includes recognition area means coupled to said controller means.

7. A recognition system as recited in claim 4 further comprising stroke unit forming means coupled to said tablet means, wherein said controller means is responsive to stroke units formed by said stroke unit forming means.

8. A recognition system as recited in claim 7 wherein said recognition domains produce recognized units.

9. A recognition system as recited in claim 8 wherein said recognition interface is receptive to stroke units and recognized units from said high-level recognizer means.

10. A recognition system as recited in claim 9 wherein said high-level recognizer means is receptive to returned units and to area registration information from said recognition interface.

11. A recognition system for use in a computer system having a processor arrangement capable of running an application program, output means for outputting symbols directed by the application program, and input means for receiving input signals to be recognized, the recognition system comprising:

a controller capable of receiving units to be recognized, the units for recognition being based at least in part on received input signals;

a plurality of independent recognition domain means, each having a data portion and a procedures portion wherein the procedures portion communicates with the controller and has access to the associated data portion, and wherein each of said recognition domain means can receive one or more units from said controller and is capable of providing an interpretation of said one or more received units to said controller; and arbitration means coupled to said controller, the arbitration means being capable of resolving conflicts between multiple interpretations developed by the independent recognition domain means and selecting a preferred interpretation and providing an indication of the preferred interpretation to the controller, and wherein the controller is arranged to output a preferred interpretation to an application program thereby permitting the application program to utilize recognized information to direct the output of said output means.

12. A recognition system as recited in claim 11 wherein:

the controller is capable of determining whether the received units need grouping;

said recognition system further includes database means coupled to said controller, said data base means including means for grouping and means for classifying received units when the controller determines that the received units need grouping, grouping the received units and passing the grouped units through the independent recognition domains and then placing the grouped units into a classification pool means.

13. A recognition system as recited in claim 11 wherein said recognition system further includes recognition area means coupled to said controller and said recognition area means representing physical areas on a tablet means identified for recognition, and wherein overlapped recognition areas define merged recognition areas capable of recognizing information in each of the overlapped recognition areas.

14. A recognition system as recited in claim 11 Wherein said controller means is receptive to stroke units derived from a tablet means.

15. A recognition system as recited in claim 14 wherein said recognition domains produce recognized units.

16. A recognition system as recited in claim 15 wherein said arbitration means is operative to pass stroke units and recognized units.

17. A recognition system as recited in claim 15 wherein arbitration means is receptive to returned units from an application program, and wherein said controller means is receptive to area registration information from said application program.

18. A computer implemented method for recognizing strokes generated by a stylus on a tablet in a computer system having a processor that runs an application program, the method comprising the steps of:

creating a stroke object from a stroke generated by a stylus on a tablet;

attempting to group said stroke object with at least one other stroke object, where in the step of attempting to group said stroke object is accomplished by passing said stroke object to through a plurality of independent recognition domains, and each independent recognition domain having a data portion and a procedures portion;

recognizing said stroke object by passing said stroke object to said plurality of independent recognition domains, wherein said independent recognition domains each return an associated recognition result;

arbitrating between conflicting recognition results generated by said independent recognition domains to select a particular one of the recognition results as a preferred recognition result; and passing the preferred recognition result to the application program for use by the application program in directing an output to a display.

19. A method as recited in claim 18 wherein said step of attempting to group said stroke object is accomplished by passing said stroke object to said plurality of independent recognition domains in order to recognize said stroke object comprising a plurality of alphanumeric characters made with said stylus on said display means.

20. A method as recited in claim 19 wherein said step of arbitrating is accomplished using a decision theory analysis.

21. A method as recited in claim 20 wherein said decision theory analysis is an expert system analysis.

22. A computer system comprising:

a processor capable of running an application program;

a display for displaying symbols generated by the application program;

a stylus for inputting handwritten strokes on the display means;

a stroke object generator for digitizing strokes input by the stylus onto the display;

low level recognizer means responsive to said stroke objects and operative to perform low level recognition on said stroke objects wherein said low level recognizer means recognizes a plurality of gestures made with said stylus on the display means, the low level recognizer means being arranged to run on said processing means;

high level recognizer means independent of the low level recognizer means and responsive to stroke objects that are not recognized by said low level recognizer and operative to perform high level recognition on strokes that are not recognized by said low level recognizer, wherein the high level recognizer means recognizes a plurality of alphanumeric characters made with said stylus on said display means, the high level recognizer means being arranged to run on said processing means and including, controller means capable of receiving units to be recognized, the units for recognition being based at least in part on the stroke objects, a plurality of recognition domain means coupled to said controller means, each of the recognition domain means being arranged to receive one or more units from said controller means and being capable of providing an interpretation of said one or more units to said controller means, and arbitration means coupled to said controller means for resolving conflicts between multiple interpretations developed by distinct ones of said recognition domain means and selecting a preferred interpretation;

a recognition interface that facilitates independent communication between the low level recognizer means and the application program, and facilitates independent communication between the high level recognizer and the application program to permit the application program to utilize recognized information to direct an output to said display; and whereby processing efficiency is increased by permitting the low level recognizer to recognize certain stroke objects and not requiring stroke objects recognized by the low level recognizer to be handled by the high level recognizer and thereby avoiding at least some preprocessing that is required by the high level recognizer.

23. A computer implemented method for recognizing strokes in a pen based computer system that are generated by a stylus on a display in the computer system, the computer system further having a processor that runs an application program, the method comprising the steps of:

creating a stroke object from a stroke generated by the stylus on the display;

determining whether the stroke object represents a gesture input by the stylus and passing an indication of the determined gesture input to the application program when a gesture is determined;

passing a stroke unit that is based at least in part on the stroke object to a plurality of distinct recognition domains when the stroke object is not determined to be a gesture, wherein said distinct recognition domains each return an associated recognition result when passed a stroke unit for recognition;

arbitrating between conflicting recognition results generated by said recognition domains when a conflict occurs therebetween to select a particular one of the recognition results as a preferred recognition result;

passing the preferred recognition result to the application program; and utilizing the application program to direct an output to the display based at least in part on the identified gesture when the stroke object is determined to be a gesture, and based at least in part on the preferred recognition result when a preferred recognition result is passed to the application program.

24. A computer implemented method as recited in claim 18, wherein said method further includes the step of defining a plurality of recognition areas being coupled to said processor, and said plurality of recognition areas representing physical areas on the tablet adapted to receive stroke objects, and wherein overlapped recognition areas define merged recognition areas capable of recognizing stroke objects in each of the overlapped recognition areas.

* * * * *